(12) United States Patent
Tsimelzon et al.

(10) Patent No.: US 8,396,886 B1
(45) Date of Patent: Mar. 12, 2013

(54) CONTINUOUS PROCESSING LANGUAGE FOR REAL-TIME DATA STREAMS

(75) Inventors: Mark Tsimelzon, Sunnyvale, CA (US); Aleksey Sanin, Sunnyvale, CA (US); Rajeev Motwani, Palo Alto, CA (US); Glenn Robert Seidman, Woodside, CA (US); Gayatri Patel, Monte Sereno, CA (US)

(73) Assignee: Sybase Inc., Dublin, CA (US)

( * ) Notice: Subject to any disclaimer, the term of this patent is extended or adjusted under 35 U.S.C. 154(b) by 1115 days.

(21) Appl. No.: 11/346,119

(22) Filed: Feb. 2, 2006

Related U.S. Application Data

(60) Provisional application No. 60/650,198, filed on Feb. 3, 2005, provisional application No. 60/700,075, filed on Jul. 18, 2005.

(51) Int. Cl.
G06F 7/00 (2006.01)
G06F 17/30 (2006.01)
(52) U.S. Cl. ..................................................... 707/769
(58) Field of Classification Search .................. 707/100, 707/999.1, 769
See application file for complete search history.

(56) References Cited

U.S. PATENT DOCUMENTS

| | | | |
|---|---|---|---|
| 5,187,787 A * | 2/1993 | Skeen et al. ................... | 719/314 |
| 5,548,755 A * | 8/1996 | Leung et al. ........................ | 707/2 |
| 5,872,921 A * | 2/1999 | Zahariev et al. ............... | 709/203 |
| 6,052,694 A * | 4/2000 | Bromberg ...................... | 707/200 |
| 7,383,253 B1 | 6/2008 | Tsimelzon et al. | |
| 2002/0038313 A1* | 3/2002 | Klein et al. ..................... | 707/200 |
| 2002/0095399 A1 | 7/2002 | Devine et al. | |
| 2003/0212699 A1 | 11/2003 | Denesuk et al. | |
| 2004/0073404 A1* | 4/2004 | Brooks et al. .................. | 702/183 |
| 2005/0267871 A1 | 12/2005 | Marchisio et al. | |
| 2006/0129458 A1 | 6/2006 | Maggio | |

OTHER PUBLICATIONS

Abadi, Daniel J. (2003) Aurora: a new model and architecture for data stream management. The VLDB Journal; Published online 2003—Springer-Verlag. Digital Object Identifier (DOI) 10.1007/s00778-003-0095-z, 20 pages.
Arasu, A. et al., STREAM: The Stanford Data Stream Management System, Book chapter, Mar. 15, 2004, Book to be edited by Garofalakis, Gehrke, and Rastogi, 21 pages.
Duran-Limon, Hector A. et al., "Resource Management for the Real-Time Support of an Embedded Publish/Subscribe System,"(*RTAS'03*), Toronto, Canada. 2003 www.comp.lancs.ac.uk/research/mpg/projects, 13 pages.
Krishnamurthy, Sailesh et al. TelegraphCQ: An Architectural Status Report, IEEE Data Engineering Bulletin, Mar. 2003, 8 pages.
Sundaresan, Srikrishnan et al., "Schema Integration of Distributed Databases Using Hyper-Graph Data Model," 2005, IEEE, 6 pages.

* cited by examiner

*Primary Examiner* — Alexey Shmatov
(74) *Attorney, Agent, or Firm* — Sterne, Kessler, Goldstein & Fox P.L.L.C.

(57) ABSTRACT

A computer software language capable of expressing registered queries that operate on one more or more data streams continuously. The language of the present invention is based on a publish/subscribe model in that queries subscribe to data streams and publish to data streams. Also, the language of the present invention can express queries that operate directly on data streams. Since queries expressed in the language of the present invention may be executed continuously and directly on data streams, the language includes a clause for specifying time-based and/or row-based windows for the input data stream. Operations are then performed on the data within such windows. In one embodiment, the language is also SQL-like and includes a clause for defining named windows (which can be used in any number of queries); a clause for detecting a pattern, and correlated database subqueries for correlating data stream data with database tables.

22 Claims, 53 Drawing Sheets

705 matching_clause::=

3500

```
EXECUTE STATEMENT DATABASE "MyDatabase"
[[
UPDATE MyTable SET MyTable.AvgPrice = ?AvgPrice WHERE MyTable.Symbol=?Symbol
]]
SELECT
      StreamIn.Symbol as Symbol,
      AVG(StreamIn.Price) as AvgPrice
FROM
      StreamIn KEEP EVERY 10 minutes
GROUP BY
      StreamIn.Symbol
OUTPUT EVERY 10 minutes
```

```
INSERT INTO StreamOut
SELECT
      *
FROM
      StreamIn,
      (DATABASE "MyDatabase" SCHEMA "schema.ccs"
      "SELECT SUM(price) FROM MyTable WHERE MyTable.Symbol=?Symbol")
```

```xml
<?xml version="1.0" encoding="UTF-8"?>
<!-- edited with XMLSPY v2004 rel. 3 U (http://www.xmlspy.com) by Mark Tsimelzon (private) -->
<xs:schema targetNamespace="http://www.coral8.com/cpl/2004/04/" xmlns:cpl="http://www.coral8.com/cpl/2004/04/"
xmlns:xs="http://www.w3.org/2001/XMLSchema" elementFormDefault="qualified" attributeFormDefault="unqualified">
    <xs:element name="DefineModule">
        <xs:annotation>
            <xs:documentation>Comment describing your root element</xs:documentation>
        </xs:annotation>
        <xs:complexType>
            <xs:complexContent>
                <xs:extension base="cpl:DefineModuleType"/>
            </xs:complexContent>
        </xs:complexType>
    </xs:element>
    <xs:element name="DefineCPLModule" type="cpl:DefineCPLModuleType">
        <xs:annotation>
            <xs:documentation>Comment describing your root element</xs:documentation>
        </xs:annotation>
    </xs:element>
    <xs:element name="Workspace" type="cpl:WorkspaceType">
        <xs:annotation>
            <xs:documentation>Comment describing your root element</xs:documentation>
        </xs:annotation>
    </xs:element>
    <xs:element name="StreamSchema" type="cpl:StreamSchemaType"/>
    <xs:complexType name="NamedObjectType" abstract="true">
        <xs:attribute name="Name" type="xs:NCName" use="required"/>
    </xs:complexType>
    <xs:complexType name="ColumnsType">
        <xs:sequence>
            <xs:element name="Column" type="cpl:ColumnType" minOccurs="0" maxOccurs="unbounded"/>
        </xs:sequence>
    </xs:complexType>
    <xs:complexType name="ColumnType" abstract="true">
        <xs:complexContent>
            <xs:extension base="cpl:NamedObjectType"/>
        </xs:complexContent>
    </xs:complexType>
    <xs:complexType name="BooleanColumnType">
        <xs:complexContent>
            <xs:extension base="cpl:ColumnType"/>
        </xs:complexContent>
    </xs:complexType>
    <xs:complexType name="IntegerColumnType">
        <xs:complexContent>
            <xs:extension base="cpl:ColumnType"/>
        </xs:complexContent>
    </xs:complexType>
    <xs:complexType name="FloatColumnType">
        <xs:complexContent>
            <xs:extension base="cpl:ColumnType"/>
        </xs:complexContent>
    </xs:complexType>
    <xs:complexType name="StringColumnType">
        <xs:complexContent>
            <xs:extension base="cpl:ColumnType">
                <xs:attribute name="Length" type="xs:integer" use="optional"/>
            </xs:extension>
        </xs:complexContent>
    </xs:complexType>
    <xs:complexType name="DefineModuleType">
        <xs:complexContent>
            <xs:extension base="cpl:NamedObjectType">
                <xs:sequence>
                    <xs:element name="Interface">
                        <xs:complexType>
                            <xs:sequence>
                                <xs:element name="Inputs" minOccurs="0">
                                    <xs:complexType>
                                        <xs:sequence>
                                            <xs:element
                                                name="Input"
                                                type="cpl:InputType"
                                                minOccurs="0"
                                                maxOccurs="unbounded"/>
                                        </xs:sequence>
                                    </xs:complexType>
                                </xs:element>
                                <xs:element name="Outputs" minOccurs="0">
                                    <xs:complexType>
                                        <xs:sequence>
                                            <xs:element
                                                name="Output"
                                                type="cpl:OutputType"
                                                minOccurs="0"
                                                maxOccurs="unbounded"/>
                                        </xs:sequence>
                                    </xs:complexType>
                                </xs:element>
                            </xs:sequence>
                        </xs:complexType>
                    </xs:element>
                </xs:sequence>
            </xs:extension>
        </xs:complexContent>
    </xs:complexType>
    <xs:complexType name="DefineCPLModuleType">
        <xs:complexContent>
            <xs:extension base="cpl:DefineModuleType">
                <xs:sequence>
                    <xs:element name="Body">
                        <xs:complexType>
```

Fig. 38b

```
<xs:sequence>
    <xs:element name="Streams" minOccurs="0">
        <xs:complexType>
            <xs:sequence>
                <xs:element
                    name="Stream"
                    type="cpl:StreamType"
                    minOccurs="0"
                    maxOccurs="unbounded"/>
            </xs:sequence>
        </xs:complexType>
    </xs:element>
    <xs:element name="ExternalStreams" minOccurs="0">
        <xs:complexType>
            <xs:sequence>
                <xs:element
                    name="ExternalStream"
                    type="cpl:ExternalS
                    treamType"
                    minOccurs="0"
                    maxOccurs="unbounded"/>
            </xs:sequence>
        </xs:complexType>
    </xs:element>
    <xs:element name="Queries" minOccurs="0">
        <xs:complexType>
            <xs:sequence>
                <xs:element
                    name="Query"
                    type="cpl:QueryType"
                    minOccurs="0"
                    maxOccurs="unbounded"/>
            </xs:sequence>
        </xs:complexType>
    </xs:element>
    <xs:element name="LoadModules" minOccurs="0">
        <xs:complexType>
            <xs:sequence>
                <xs:element
                    name="LoadModule"
                    type="cpl:LoadModuleType"
                    minOccurs="0"
                    maxOccurs="unbounded"/>
            </xs:sequence>
        </xs:complexType>
    </xs:element>
</xs:sequence>
            </xs:sequence>
        </xs:extension>
    </xs:complexContent>
</xs:complexType>
<xs:complexType name="InputType">
    <xs:complexContent>
        <xs:extension base="cpl:NamedObjectType">
            <xs:attribute name="StreamSchema" type="xs:anyURI" use="required"/>
        </xs:extension>
    </xs:complexContent>
</xs:complexType>
<xs:complexType name="OutputType">
    <xs:complexContent>
        <xs:extension base="cpl:NamedObjectType">
            <xs:attribute name="StreamSchema" type="xs:anyURI" use="required"/>
        </xs:extension>
    </xs:complexContent>
</xs:complexType>
<xs:complexType name="StreamType">
    <xs:complexContent>
        <xs:extension base="cpl:NamedObjectType">
            <xs:attribute name="StreamSchema" type="xs:anyURI" use="required"/>
        </xs:extension>
    </xs:complexContent>
</xs:complexType>
<xs:complexType name="ExternalStreamType">
    <xs:complexContent>
        <xs:extension base="cpl:StreamType">
            <xs:attribute name="ExternalURI" type="xs:anyURI" use="required"/>
        </xs:extension>
    </xs:complexContent>
</xs:complexType>
<xs:complexType name="QueryTextType">
    <xs:simpleContent>
        <xs:extension base="xs:string"/>
    </xs:simpleContent>
</xs:complexType>
<xs:complexType name="LoadModuleType">
    <xs:complexContent>
        <xs:extension base="cpl:NamedObjectType">
            <xs:sequence>
                <xs:element name="InputValues" minOccurs="0">
                    <xs:complexType>
                        <xs:sequence>
                            <xs:element name="InputValue"
                                type="cpl:InputValueType" minOccurs="0"
                                maxOccurs="unbounded"/>
                        </xs:sequence>
                    </xs:complexType>
                </xs:element>
                <xs:element name="OutputValues" minOccurs="0">
                    <xs:complexType>
                        <xs:sequence>
                            <xs:element name="OutputValue"
                                type="cpl:OutputValueType" minOccurs="0"
                                maxOccurs="unbounded"/>
                        </xs:sequence>
                    </xs:complexType>
```

```xml
                                        </xs:element>
                                </xs:sequence>
                                <xs:attribute name="ExternalName" type="xs:anyURI" use="required"/>
                        </xs:extension>
                </xs:complexContent>
        </xs:complexType>
        <xs:complexType name="LoadAdapterType">
                <xs:complexContent>
                        <xs:extension base="cpl:NamedObjectType">
                                <xs:sequence>
                                        <xs:element name="ParamValues" minOccurs="0">
                                                <xs:complexType>
                                                        <xs:sequence>
                                                                <xs:element name="ParamValue"
                                                                        type="cpl:ParamValueType" minOccurs="0"
                                                                        maxOccurs="unbounded"/>
                                                        </xs:sequence>
                                                </xs:complexType>
                                        </xs:element>
                                </xs:sequence>
                                <xs:attribute name="ExternalName" type="xs:anyURI" use="required"/>
                                <xs:attribute name="PrimaryStream" type="xs:anyURI" use="required"/>
                        </xs:extension>
                </xs:complexContent>
        </xs:complexType>
        <xs:complexType name="InputValueType">
                <xs:complexContent>
                        <xs:extension base="cpl:NamedObjectType">
                                <xs:attribute name="Value" type="xs:NCName" use="required"/>
                        </xs:extension>
                </xs:complexContent>
        </xs:complexType>
        <xs:complexType name="ParamValueType">
                <xs:complexContent>
                        <xs:extension base="cpl:NamedObjectType">
                                <xs:attribute name="Value" type="xs:string" use="required"/>
                        </xs:extension>
                </xs:complexContent>
        </xs:complexType>
        <xs:complexType name="OutputValueType">
                <xs:complexContent>
                        <xs:extension base="cpl:NamedObjectType">
                                <xs:attribute name="Value" type="xs:anyURI" use="required"/>
                        </xs:extension>
                </xs:complexContent>
        </xs:complexType>
        <xs:complexType name="WorkspaceType">
                <xs:complexContent>
                        <xs:extension base="cpl:NamedObjectType">
                                <xs:sequence>
                                        <xs:element name="Streams" minOccurs="0">
                                                <xs:complexType>
                                                        <xs:sequence>
                                                                <xs:element name="Stream" type="cpl:StreamType"
                                                                        minOccurs="0" maxOccurs="unbounded"/>
                                                        </xs:sequence>
                                                </xs:complexType>
                                        </xs:element>
                                        <xs:element name="ExternalStreams" minOccurs="0">
                                                <xs:complexType>
                                                        <xs:sequence>
                                                                <xs:element name="ExternalStream"
                                                                        type="cpl:ExternalStreamType" minOccurs="0"
                                                                        maxOccurs="unbounded"/>
                                                        </xs:sequence>
                                                </xs:complexType>
                                        </xs:element>
                                        <xs:element name="LoadModules" minOccurs="0">
                                                <xs:complexType>
                                                        <xs:sequence>
                                                                <xs:element name="LoadModule"
                                                                        type="cpl:LoadModuleType" minOccurs="0"
                                                                        maxOccurs="unbounded"/>
                                                        </xs:sequence>
                                                </xs:complexType>
                                        </xs:element>
                                        <xs:element name="LoadAdapters" minOccurs="0">
                                                <xs:complexType>
                                                        <xs:sequence>
                                                                <xs:element name="LoadAdapter"
                                                                        type="cpl:LoadAdapterType" minOccurs="0"
                                                                        maxOccurs="unbounded"/>
                                                        </xs:sequence>
                                                </xs:complexType>
                                        </xs:element>
                                </xs:sequence>
                        </xs:extension>
                </xs:complexContent>
        </xs:complexType>
        <xs:complexType name="QueryType">
                <xs:complexContent>
                        <xs:extension base="cpl:NamedObjectType">
                                <xs:sequence>
                                        <xs:element name="QueryText" type="cpl:QueryTextType"/>
                                </xs:sequence>
                        </xs:extension>
                </xs:complexContent>
        </xs:complexType>
        <xs:complexType name="StreamSchemaType">
                <xs:complexContent>
                        <xs:extension base="cpl:NamedObjectType">
                                <xs:sequence>
                                        <xs:element name="Columns" type="cpl:ColumnsType" minOccurs="0"/>
                                </xs:sequence>
                        </xs:extension>
                </xs:complexContent>
        </xs:complexType>
</xs:schema>
```

| | |
|---|---|
| Statement: | CreateWindowStatement \| SelectStatement \| OnStatement |
| CreateWindowStatement: | "create" "window"<br>WindowName "schema" STRING<br>Window |
| SelectStatement: | InsertIntoClause<br>SelectClause<br>FromClause<br>[MatchingClause]<br>[WhereClause]<br>[ GroupClause<br>[ HavingClause ] ]<br>[FlworClause]<br>[ OrderClause ]<br>[ OutputClause] |
| OnStatement: | ON Name<br>WHEN ConditionalExpression<br>DELETE FROM WindowName<br>WHERE ConditionalExpression |
| InsertIntoClause: | INSERT INTO Name<br>\| EXECUTE STATEMENT DATABASE """ Name """ "[["<br>query_statement "]]" |
| SelectClause: | SELECT ResultExpressionList; |
| FromClause: | FROM DataSourceList |
| MatchingClause: | MATCHING PatternDescription ON ConditionalExpression |
| WhereClause: | WHERE ConditionalExpression |
| GroupClause: | GROUP BY ExpressionList |
| HavingClause: | HAVING ConditionalExpression |
| FlowrClause: | FLWOR "for" Expression "let" Expression "where" ConditionalExpression<br>("order by" Expression)? "return" Expression |
| OutputClause: | OUTPUT (ALL)? EVERY Interval (BY TimestampColumnName)?<br>\| OUTPUT (ALL)? FIRST WITHIN Interval (BY TimestampColumnName)?<br>\| OUTPUT AFTER Interval (BY TimestampColumnName)? |
| ResultExpressionList: | * \| ResultExpression ("," ResultExpression ) * |
| ResultExpression: | Expression ["as" AliasName ] |
| Name: | NAME |

Fig. 39a

| | |
|---|---|
| DataSourceList: | JoinedDataSource ("," JoinedDataSource ) * |
| JoinedDataSource: | DataSource<br>( JoinType DataSource "on" ConditionalExpression )? |
| JoinType: | ( "left" "outer" "join"<br>\| "right" "outer" "join"<br>\| "full" "outer" "join"<br>\| "join"<br>) |
| DataSource: | Name [ "as" AliasName ][Window]* |
| Window: | "keep" ViewBasic ViewRefinements* |
| ViewBasic: | "all"<br>\| "last"<br>\| (every)? INTEGER "rows"<br>\| (every)? INTERVAL (by AliasName.ColumnName)?<br>ViewRefinements: "sort" "by" ExpressionList<br>[ "asc" \| "ascending" \| "desc " \| "descending" ]<br>\| ( "per" Expression \| "per" "{" ExpressionList "}" )<br>\| "starting" "at" INTERVAL \| "distinct" |
| BasicCompareOperator: | "<" \| "<=" \| "=" \| "=>" \| ">" \| "!=" |
| ScalarExpression: | AddExpression<br>\| "(" ScalarExpression ")" |
| AddExpression: | MultExpression ( AddOperator MultExpression ) * |
| AddOperator: | "+" \| "-" \| "\|\|" |
| MultExpression: | CallExpression ( MultOperator CallExpression ) * |
| MultOperator: | "*" \| "/" \| "mod" |
| CallExpression: | FunctionName [ "(" ActualExpressionList ")" ] |
| FunctionName: | "sum" \| "count" \| "min" \| "max" \| "avg" \| "median" \|<br>"floor" \| "ceil" \| "round" \| "abs" \| "length" \|<br>"to_boolean" \| "to_float" \| "to_integer" \|<br>"to_interval" \| "to_long" \| "to_timestamp" |
| ActualExpressionList: | ExpressionList |
| SignExpression: | SignOperator SimpleExpression |
| SignOperator: | "+" \| "-" |
| SimpleExpression: | "null" \| NUMBER \| TEXT \|<br>DataSourceName "." ColumnName |

Statements

SELECT
form:
```
output_destination
SELECT ...
FROM ...
MATCHING ...
WHERE ...
GROUP BY ...
HAVING ...
FLWOR ...
OUTPUT ...
``` case1: output_destination uses INSERT INTO clause
case2: output_destination uses EXECUTE STATEMENT clause

CREATE WINDOW
form:
```
CREATE WINDOW window_name SCHEMA " schema_filename "
window_expression
```

ON
form:
```
ON datastream_name WHEN condition DELETE FROM window_name
WHERE condition
``` case1: not used with WHEN subclause
    case 1a: not used with WHERE clause
    case 1b: used with WHERE clause
case2: used with WHEN clause
    case 2a: not used with WHERE clause
    case 2b: used with WHERE clause

SELECT Statement Clauses output_destination
    INSERT INTO
        form:

| INSERT INTO destination |
|---| case 1: datastream_name
        case 2: window_name

EXECUTE STATEMENT
        form:

| EXECUTE STATEMENT DATABASE " database_name " [[ query_statement ]] |
|---| case 1: delete query statement
        case 2: insert query statement
        case 3: update query statement SELECT
    form:

| SELECT expression1 as alias1, expression2 as alias2, expression3 as alias3, ... |
|---| case 1: no function use in expressions
    case 2: simple function use in expressions
    case 3: aggregate function use in expressions
    case 4: one or more defined by subqueries
    case 5: one or more expressions are aliased
    case 6: entire list is an asterisk

Fig. 41a

FROM form:

> FROM source1 as alias1, source2 as alias2, source3 as alias3, ...

case 1: single datastream
  case 1a: datastream defined by Subquery
  case 1b: datastream defined by two outer_joined_datastreams
case 2: single datastream with one or more windowed datastreams
  case 2a: one or more defined by subqueries
  case 2b: one or more defined by two outer_joined_datastreams
case 3: multiple windowed datastreams
  case 3a: one or more defined by subqueries
  case 3b: one or more defined by two outer_joined_datastreams
case 4: single datastream with single Database query

(embedded_sql_select)

case 4a: datastream defined by subquery case 4b: datastream defined by outer_joined_datastreams one or more window_expressions can be used to define the window on a datastream

MATCHING

Note: an event is equivalent to an arrival to a datastream form:

> MATCHING pattern_description ON condition case 1: specify order of events within time interval
case 2: specify order of events with last event not occurring within time interval
case 3: specify order of events with first event not occurring within time interval
case 4: specify that two events must occur (A && B)
case 5: specify that either of two events may occur (A | | B)

WHERE form:

> WHERE condition case 1: condition expression referencing single datastream or windowed datastream columns and using simple functions only.
  case 1a: datastream defined by subquery
  case 1b: one or more values in expressions defined by subquery
case 2: condition expression referencing mutliple datastream or windowed datastream columns and using simple functions only.
  case 2a: one or more defined by subqueries
  case 2b: one or more values in expressions defined by subquery

Fig. 41b

GROUP BY
form:

> GROUP BY expression1, expression2, ...

case 1: used with aggregation function in expression list
case 2: used with OUTPUT EVERY clause
case 3: used with OUTPUT FIRST WITHIN clause

HAVING
form:

> HAVING condition case 1: must include use of aggregation function in expression list

FLWOR
form:

> FOR for_expression LET let_expression WHERE where_expression ORDER BY order_by_expression RETURN return_expression case 1: not using ORDER BY
case 2: using ORDER BY

OUTPUT
EVERY
form:

> OUTPUT ALL EVERY every_clause_body case 1: not using ALL keyword
case 2: using ALL keyword every_clause_body

FIRST WITHIN
form:

> OUTPUT ALL FIRST WITHIN every_clause_body case 1: not using ALL keyword
case 2: using ALL keyword every_clause_body

Fig. 41c

AFTER
form:

> OUTPUT AFTER time_interval case 1: time interval based
case 2: row interval based

BY
form:

> BY column_name case 1: not used
case 2: column name

FIG. 41d

4200 expression or condition column names
arithmetic operations
string operations
Boolean operations
Function calls
subquery(s)

IF expression THEN expression ELSE expression END

CASE
WHEN expression THEN expression (one or more WHEN THEN subclauses)
ELSE expression END CASE expression
WHEN expression THEN expression (one or more WHEN THEN subclauses)
ELSE expression END CASE

FIG. 42

4300 subquery form:
```
SELECT ...
FROM ...
MATCHING ...
WHERE ...
GROUP BY ...
HAVING ...
FLWOR ...
OUTPUT ...
```

FIG. 43

4400 window_expression form:
> KEEP EVERY time_interval SORT BY expression DISTINCT WITHIN expression PER {expression1, expression2, ...} STARTING AT time

KEEP
    LAST
        case 1: not used
        case 2: used instead of EVERY
    ALL
        case 1: not used
        case 2: used instead of EVERY
    EVERY
        case 1: not used
        case 2: time interval based
        case 3: row interval based

SORT BY
    case 1: expression list ordered by ascending
    case 2: expression list ordered by descending
    case 3: expression list ordered by ascending with DISTINCT
    case 4: expression list ordered by descending with DISTINCT

WITHIN
    case 1: not used
    case 2: expression filter

PER
    case 1: not used
    case 2: single expression
    case 3: expression list

STARTING AT
    case 1: not used
    case 2: time interval

FIG. 44

4500 every_clause_body form:

> EVERY time_interval BY timestamp_column STARTING AT time case 1: not used in conjunction with GROUP BY
 case 1a: time interval based
 case 1b: row interval based
case 2: used in conjunction with GROUP BY
 case 2a: time interval based
 case 2b: row interval based

BY case 1: not used
case 2: column name

STARTING AT case 1: not used
case 2: time interval

FIG. 45

4600 embedded_sql_select form:
(DATABASE " time_interval " SCHEMA " schema_filename " " external_database_query" )

FIG. 46

4700 outer_joined_datastreams form:
> join_type OUTER JOIN datasource ON condition case 1: datasource names a datastream case 1a: not using OUTER, thus is actually an inner join case 1b: using OUTER case 1b i: join_type is FULL case 1b ii: join_type is LEFT case 1b iii: join_type is RIGHT case 2: datasource names a windowed datastream case 1a: not using OUTER, thus is actually an inner join case 2b: using OUTER case 2b i: join_type is FULL case 2b ii: join_type is LEFT case 2b iii: join_type is RIGHT

FIG. 47

CONTINUOUS PROCESSING LANGUAGE FOR REAL-TIME DATA STREAMS

RELATED APPLICATIONS

This application claims the benefit of U.S. Provisional Application No. 60/650,198, filed on Feb. 3, 2005 with first-named inventor Mark Tsimelzon, and titled "Continuous Processing Language for Real-time Data Streams," the contents of which are incorporated by reference as if fully disclosed herein.

This application claims the benefit of U.S. Provisional Application No. 60/700,075, filed on Jul. 18, 2005 with first-named inventor Mark Tsimelzon, and titled "Pattern language for Defining Patterns in a Continuous Processing Language," the contents of which are incorporated by reference as if fully disclosed herein

BACKGROUND OF THE INVENTION

1. Field of the Invention

The present invention pertains generally to computer languages, and in particular to descriptions for queries that operate upon data stream data continuously.

2. Description of the Related Art

CEP Applications and their Requirements

Software applications are needed to address a growing set of problems arising in such diverse areas as:
  Finance (program trading and execution, risk management, pricing, fraud management)
  Network Management (security monitoring and response, network and application monitoring, SLA monitoring)
  Business Process Management (process monitoring, exception management, scheduling)
  Sensor Networks (RFID apps, manufacturing process monitoring, power gird monitoring, military)

These applications, sometimes referred to as Complex Event Processing (CEP) applications, have a number of requirements that are difficult to meet using conventional tools. CEP applications must:
  1. Support arbitrarily-complex computation (for example, expressions, filtering, windows, aggregations, joins between multiple data sources, correlations of real-time and/or historical data, pattern matching, and so on)
  2. Process large volumes of messages at high incoming message rates (from 1,000 to 100,000 messages per second, or more)
  3. Exhibit very low processing latency (from milliseconds to seconds)
  4. Be scalable and reliable
  5. Be easy to build, modify, and maintain Until recently, there have been two ways to build CEP applications:
  Use a relational database (possibly of an in-memory variety)
  Code a custom "black box" solution Unfortunately, both approaches create major problems, discussed below.

Using Relational Databases for CEP Applications

Relational databases have been around for a while. The now-standard relational data model and Standard Query Language (SQL) are optimally designed for writing traditional (non-CEP) applications. These traditional applications are characterized by the following:
  Most of the data held in the database is fairly static.
  Updates and/or complex queries are comparatively infrequent.

This is not true for CEP applications, however. As the volume of incoming messages, events, and updates goes up, and the increasing demands of business require much more frequent complex analysis, conventional database solutions begin to break down. More and more query requests are sent to the database, and the database becomes a bottleneck. This is not surprising, given the limitations of database technology:
  A database stores everything on disk and is optimized accordingly. (In-memory databases help here, but they suffer from other problems.)
  A database is hard to optimize for both rapid push AND pull of data (push/pull conflict).
  A database is not designed for continuous processing. If you want to know an answer to a query ten times a second, you must issue the query ten times a second. This solution cannot be applied to hundreds or thousands of queries.

Traditional databases offer a feature called triggers, which, in theory, enables the database to respond to new data being inserted into the table. Unfortunately, all modern databases implement triggers in a uniformly unscalable and unmanageable way, as triggers were an afterthought in database design. Building complex logic in triggers is difficult or impossible, and trigger performance can be quite poor.

For these reasons, databases are rarely used for high-volume low-latency CEP applications—databases just do not scale.

Building Custom CEP Applications

Custom applications alleviate many of database problems, but they create a large number of new ones. Custom applications (also known as black boxes) start simple, as the initial requirements are typically very limited. Many begin with simple filtering or aggregation. Problems increase quickly, however, as windows, complex aggregations, correlation, pattern matching, and other levels of complexity are added. Despite the promise of a "custom solution", performance rapidly becomes a problem. Providing enterprise features such as scalability, clustering and high-availability while developing, extending and maintaining custom CEP Applications is notoriously difficult and time-consuming.

Some custom applications are written on top of a messaging system, or a message bus. Unfortunately, message buses solve mainly transport-level problems, such as asynchronous delivery, publish/subscribe multicast and guaranteed delivery. Other than performing basic filtering, message busses offer no support for any complex computation, correlation or pattern matching. All of these tasks must still be implemented in a custom application.

Continuous Processing Languages

In view of the above, there is a need for a general-purpose language for creating CEP applications. More specifically, there is a need for a general-purpose language for expressing registered queries that operate on data streams continuously.

In the last few years, the Stanford STREAM project has researched and published papers describing a Continuous Query Language (CQL) that is SQL-like at its core. However, there are several disadvantages with STREAM:
  STREAM is not based on a publish/subscribe model and therefore is difficult to scale.
  With STREAM, queries do not operate directly on data streams, which makes STREAM complex. STREAM requires use of 3 types of operators, stream-to-relation, relation-to-relation, and relation-to-stream, to process data stream data and produce an output data stream. This results in an overly complex object model STREAM does not have a simple clause for expressing a pattern. Detecting patterns can be a key part of a CEP application.

STREAM has neither the ability to express a query that correlates data from a database table to a data stream, nor the ability to express a query that writes data from a data stream to a database table.

STREAM does not have a clause for defining a named window by data stream rows and/or time, where the defined window can be used in one or more queries.

More information about STREAM can be found in the "Description of the Related Art" section of the provisional application Ser. No. 60/650,198 titled "Continuous Processing Language for Real-time Data Streams" which is referenced in the "Related Applications" section above.

Berkeley's TelegraphCQ project also has researched and published papers describing a Continuous query system which employs modifications on the OpenSource PostgreSQL Database. In addition, Brown University has an Aurora data stream Management System project. Both Berkeley's and Brown's system generally suffer from the same disadvantages as described with respect to STREAM. More information about the Berkeley and Brown systems can be found in provisional application Ser. No. 60/650,198 titled "Continuous Processing Language for Real-time Data Streams" which is referenced in the "Related Applications" section above.

SUMMARY OF THE INVENTION

The present invention provides a computer software language for expressing registered queries that operate on one more or more data streams continuously. Such language may be used in a system where queries are registered with a server and execute continuously. An example of such a system is described in U.S. patent application Ser. No. 11/015,963, titled "Publish and Subscribe Capable Continuous Query Processor for Real-Time Data Streams," which was filed on Dec. 17, 2004 with Mark Tsimelzon as the first-named inventor. The contents of this application are incorporated by reference as if fully disclosed herein.

The language of the present invention is based on a publish/subscribe model in that queries subscribe to data streams and publish to data streams. Using a publish/subscribe model enables queries to easily scale. Also, the language of the present invention can express queries that operate directly on data streams, rendering the language simple and easy to use.

Since queries expressed in the language of the present invention may be executed continuously and directly on data streams, the language includes a clause for specifying time-based and/or row-based windows for the input data stream. Operations are then performed on the data within such windows. The language can support sliding and jumping windows. The language may also include a clause for defining named windows, which can be used in any number of queries.

In one embodiment, the language of the present invention also includes the following:

A clause for detecting an event pattern. The clause evaluates to true when a pattern is detected over one or more defined time intervals.

Database subqueries for reading data from a database and correlating it to a data stream.

Database subqueries for writing data from a data stream to correlated values in a database Clauses for specifying intervals for outputting data to the output data stream.

Clauses for specifying a time delay for outputting data to the output data stream.

In one embodiment, the clauses in the language are SQL-like to enable the language to be easily learned by those familiar with SQL. SQL is a language used to express queries for operating on data tables, but the language of the present invention can include SQL-like clauses for operating on data streams. For instance, the language can include the following SQL-like clauses:

an INSERT INTO clause for specifying an output data stream to which a query publishes.

a FROM clause for specifying at least one input data stream to which the query subscribes.

a SELECT clause for specifying the columns in an input data stream that will be produced in the output data stream.

a WHERE clause for specifying a condition for filtering rows in an input data stream, where rows in the input data stream match the condition that will be used to produce output for the output data stream.

a GROUPBY clause for grouping rows in an input data stream based on a value specified column in each row, where such grouping is performed for the purpose of producing output in accordance with such grouping.

The foregoing clauses are just examples of clauses that can be used, and the present invention is in no way limited to any particular clause name.

BRIEF DESCRIPTION OF THE FIGURES

FIG. 35 illustrates an example embedded SQL execution statement for an UPDATE to a table.

FIG. 36 illustrates an example embedded SQL SELECT statement.

FIG. 38a-c list an example XML schema for a continuous processing language.

FIG. 39a-b list an example Backus Naur Form for an embedded continuous processing language for query.

FIG. 40 lists a text form of the top statements using an informal grammar.

FIG. 41a-d list a text form of the top clauses of a SELECT statement using an informal grammar.

FIG. 42 lists a text form of expressions or grammars using an informal grammar.

FIG. 43 lists a text form of subqueries using an informal grammar.

FIG. 44 lists a text form of window expressions using an informal grammar.

FIG. 45 lists a text form of the EVERY subclause for OUTPUT clauses using an informal grammar.

FIG. 46 lists a text form of an embedded SQL SELECT statement using an informal grammar.

FIG. 47 lists a text form of an outer join clause using an informal grammar.

DETAILED DESCRIPTION OF THE PREFERRED EMBODIMENTS

Figure 1:
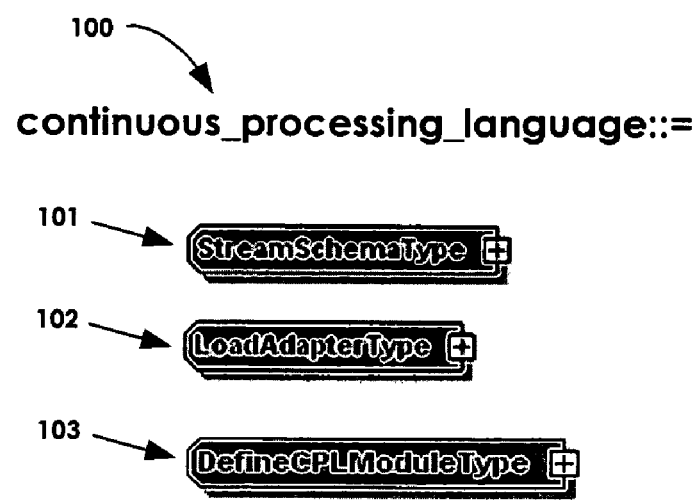
FIG. 1 illustrates three primary constructs, StreamSchemaType, LoadAdapterType, and DefineCPLModuleType, for a continuous processing language.

In accordance with one embodiment of the present invention is a continuous processing language 100 which advantageously describes data streams each representing a continuously changing source of row data, adaptors, and modules and associated constructs. These primary constructs are graphically depicted as StreamSchemaType 101, LoadAdaptorType 102, and DefineCPLModuleType 103 in FIG. 1. The StreamSchemaType 101 is used for describing Stream column names and types, the LoadAdapterType 102 is used for describing Adapters, and the DefineCPLModuleType 103 is used for describing continuous queries. While a preferred embodiment employs XML schema to describe the language constructs, those skilled in the art may desire to use other grammar and syntax for description.

Figure 2:
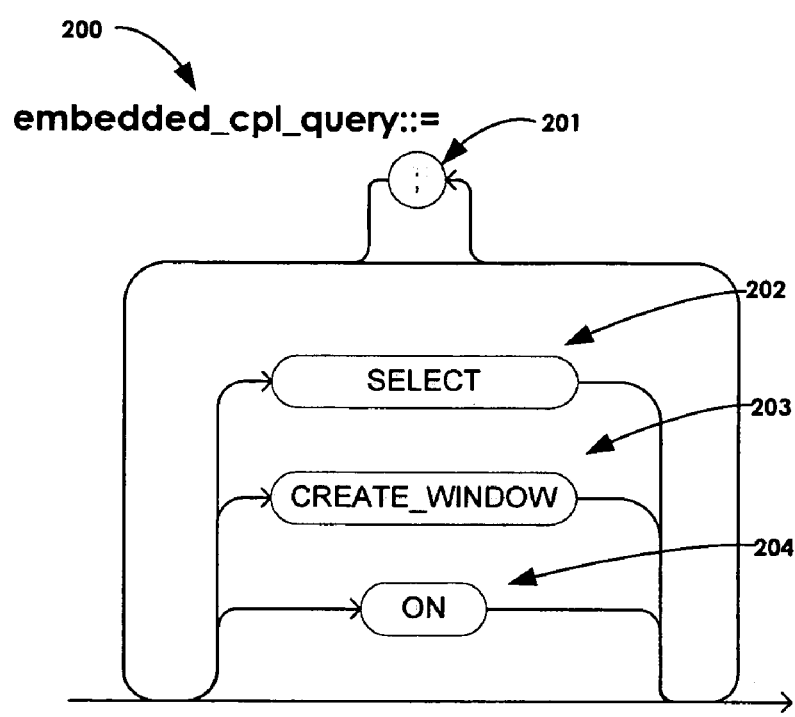
FIG. 2 illustrates a top level grammar description of a query statement using an embedded continuous processing language for query sublanguage, where the query statement is text that is to be inserted in a module.

One embodiment of the present invention includes a continuous process language for describing continuous, registered queries within modules. A preferred embodiment will describe the embedded continuous processing language for query 200 using a Backus Naur Form 3900 as in FIG. 39a-b. Those skilled in the art may decide to employ other forms of description including XML. Backus Naur Form is preferred and it is very suitable for query languages. The top level of all embedded query text is visually described in FIG. 2 and includes a list of SELECT statements 202, CREATE WINDOW statements 203, and ON statements 204, in any order, separated by semicolons 201.

FIG. 40 through FIG. 47 illustrate an overview of the continuous processing language (CPL) described in FIGS. 3-39. More specifically, FIGS. 40 through 47 illustrate clauses and keywords (without the specific syntax of such clauses and keywords) that may be included in a continuous processing language according to one embodiment of the present invention. Such the clauses and keywords are illustrated in more detail in FIGS. 3-34. Those skilled in the art will appreciate that the illustrated language is just one example of the present invention, and the invention is not limited to the specific clauses and keywords illustrated in FIGS. 40 through 47. FIG. 3 through FIG. 6 graphically depict further details of each of the primary constructs of a continuous processing language embodiment using an XML schema. FIG. 7 through FIG. 37 graphically depict embedded continuous processing language grammar for the top level list of query clauses of FIG. 2.

For a complete description of constructs in one embodiment of a continuous processing language, see the XML schema listing 3800 in FIG. 38a-c. For a complete description of an embedded continuous processing language for query, see the Backus Naur Form listing 3900 in FIG. 39a-b. These two detailed descriptions are provided since many of the graphical visualizations in the figure of FIG. 1 through FIG. 37 lack the detail of the textual description of these two figures.

Figure 3:
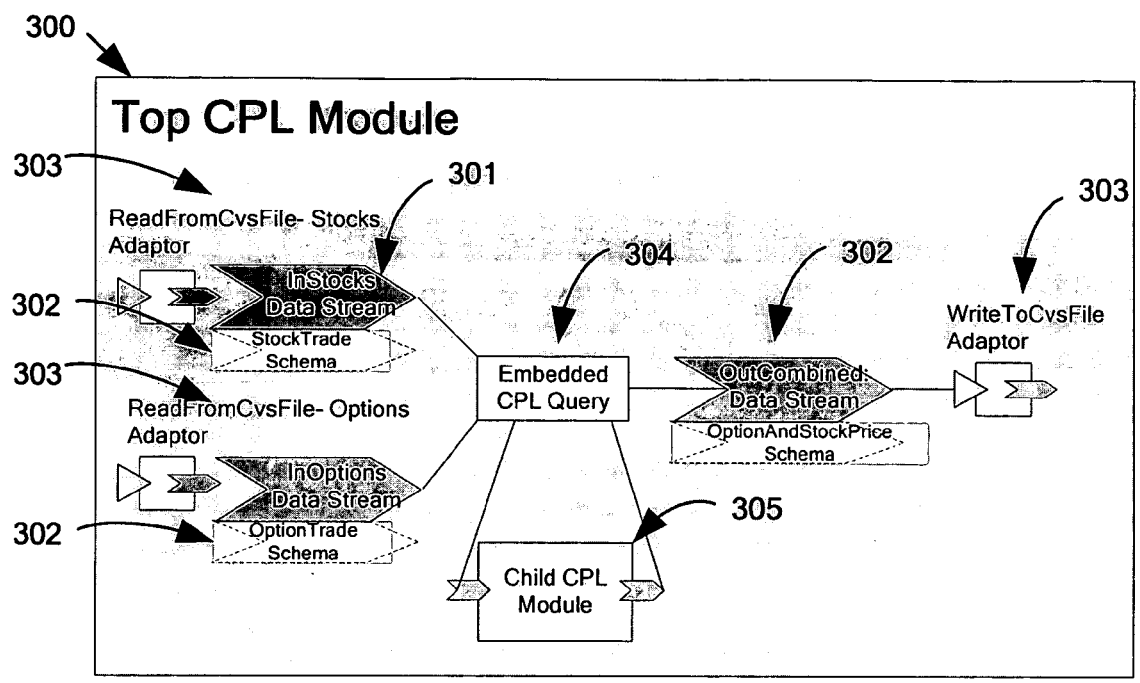
FIG. 3 illustrates a CPL file with workspaces containing data streams and modules, with modules comprising embedded continuous processing language for query text.

With reference to FIG. 3, one embodiment of the present invention provides a grammar that has a CPL file, or CPL top module 300 example shown in FIG. 3 that includes several data streams 301, corresponding StreamSchemas 302, corresponding Adapters 303, embedded CPL Query 304, and child CPL module 305. Different CPL files will include different compositions which will contain more or less of each of these object types.

Embodiments of the present invention will benefit from establishing a set of foundational object types with which to use for building up descriptions of more complex types. Embodiments employing XML Schema, for example, can establish one or more XML Schema ComplexTypes.

One embodiment of the present invention provides an XML schema ComplexType called "NamedObjectType" that provides only a name attribute. Embodiments may find that extending a reusable NamedObjectType is beneficial in the further ComplexType definitions requiring a name attribute. This is the approach taken in the preferred embodiment described.

Figure 4:
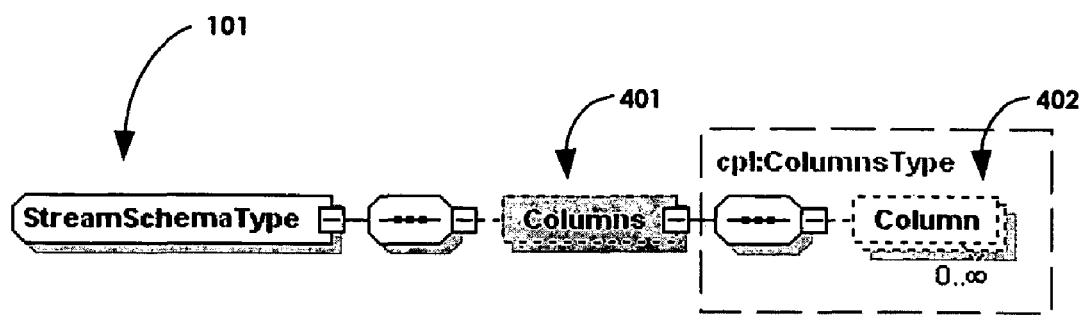
FIG. 4 illustrates an XML schema for a StreamSchemaType.

One embodiment of the present invention provides a StreamSchemaType 101, extending NamedObjectType, that includes a description of one or more data stream columns (401 and 402), in FIG. 4. The columnType extends NamedObjectType so it can have the name attribute. The type of a column is determined by the inclusion of one of several columnType extensions. They are BooleanColumnType, IntegerColumnType, FloatColumnType, and StringColumnType. These named types are referred to by their names in the query text of modules described later.

One embodiment of the present invention provides support for an XMLStringColumnType where each such declared column contains a single arbitrarily complex XML element.

Figure 5:
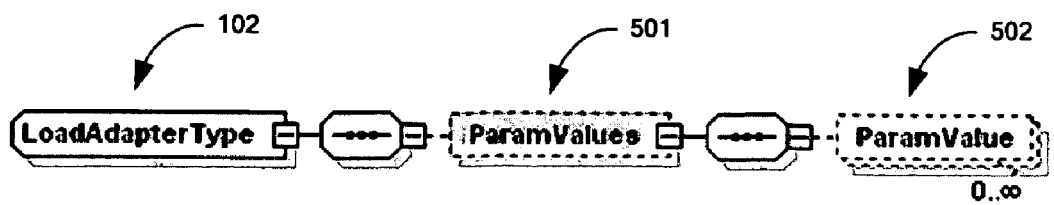
FIG. 5 illustrates an XML schema for a LoadAdapterType.

One embodiment of the present invention provides a LoadAdapterType 102, extending NamedObjectType, that describes the configuration of an Adapter to an external data source so that it can be introduced as a data stream, in FIG. 5. The LoadAdapterType 102 includes one or more ParamValues (501 and 502), extending NamedObjectType, which each include a value supplied as a string. This allows an Adapter to be configured via a simple named value list scheme. The LoadAdapterType 102 also includes a PrimaryStream URI, as listed in FIG. 38a-c, to denote the address of the data stream that the Adapter's data stream may be referenced by. Embodiments may find an additional ExternalName URI, as listed in FIG. 38a-c, to assist in referring to a data stream whose name outside the context of the names identified in the CPL module 300.

One embodiment of the present invention extends a LoadAdaptorType 102 to support various types of data stream information sources. Such sources can include relational database tables and views as sources and targets. For example, ParamValues (501 and 502) could include "RelationalDatabaseAddress", "RelationalObjectName", and "RelationalQuery". This could represent the Database location, the name of the table or view to retrieve or insert information to or from, and any query to be applied to it.

Figure 6:
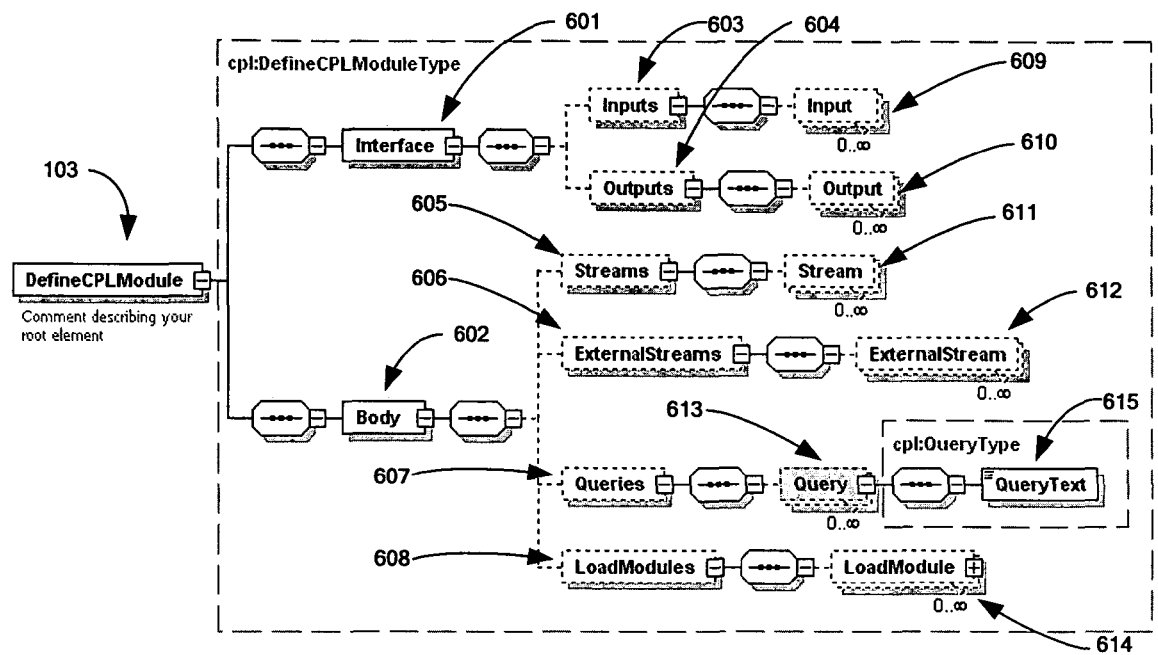
FIG. 6 illustrates an XML schema for a DefineCPLModuleType.

One embodiment of the present invention provides a DefineCPLModuleType 103 in FIG. 6, extending NamedObjectType, that describes the contents of a child CPL module 305. A child CPL module 305 includes an Interface 601 and Body 602 so that it can be reused by parent CPL modules.

One embodiment of the present invention provides an Interface element 601 containing the description of how the child CPL module 305 provides Input (603 and 609) and Output (604 and 610) StreamSchemas to external data streams and other modules.

One embodiment of the present invention provides a Body element 602 containing the description of the actual CPL processing of the CPL module 305. Within a Body element 602, Stream elements (605 and 611) are instances of StreamType that extends NamedObjectType and are included in a CPL module 305 when a local Stream is employed for intermediate processing inside the module. StreamTypes include not only a name attribute but also a StreamSchema attribute containing a URI to the StreamSchema that governs the data that the Stream needs to support.

Embodiment of the present invention may find the provision of ExternalStream elements (606 and 612) beneficial for declaring the utilization of Streams external to the present invention in order to easily publish or subscribe to Stream data from external sources and targets. ExternalStream elements are of ExternalStreamType which extends StreamType. While inheriting the name and StreamSchema attributes, ExternalStreamType includes also the URI to the external Stream. It is expected that ExternalStreams represent Streams of varying formats.

Embodiments of the present invention may include one or more QueryText elements (613 and 615) containing text adhering to an embedded continuous processing language for query 200 whose grammar may be described by the Backus Naur Form listing 3900 in FIG. 39a-b. Embodiments may employ any appropriate grammar for the text description in a QueryText element 615. It is important to realize, however, that the usefulness of the child CPL module 305 manifests from the QueryText element 615 description referring to the manipulation of continuous data in the child CPL module 305 Inputs 603, Outputs 604, local Streams 605, and ExternalStreams 606.

One embodiment of the present invention extends the CPL module 305 to further refer to additional LoadModule elements (608 and 614). It is the primary intention of this embodiment to deploy the LoadModules as the runtime implementers of the embedded continuous processing language for query 200 statement in the QueryText element 615. As such, the compiler for the embedded continuous processing language for query 200, understands which LoadModules it should employ to give dynamics to the intended semantics of each statement, and it knows how to launch LoadModules passing in both data streams and scalars as parameters to each LoadModule.

Embodiments employ a LoadModule element to represent a unit of processing corresponding to a specific operation. While a LoadModule can be an instance of a generic, potentially non-CPL LoadModuleType, it will typically be of type DefineCPLModuleType 103 which will define CPL processing. In fact, embodiments may actually extend LoadModuleType in constructing a DefineCPLModuleType 103 as it does in FIG. 38a-c. LoadModuleType includes only the Interface element 601 and no Body element 602 as the Body is specific to child CPL modules 305. The additional LoadModule elements (608 and 614) provide the means for DefineCPLModuleTypes 103 to represent additional children modules for a CPL module 305. These additional LoadModules 614 may be referenced in a QueryText element 615.

One embodiment of the present invention extends a child LoadModule element designated to include a mapping of one or more associations of any data stream column name to an interface column name of any of the StreamSchemas declared as an input or output in the LoadModule's interface. This provides arbitrary mapping of columns from any data stream to any column in the interface of a LoadModule. For example, a data stream column named "frequency" could be mapped to an interface column called "value" which is used to compute a moving average.

One embodiment of the present invention allows only certain columns to be mapped to certain interface columns based on the type of the columns. For example, an integer column could be mapped to a float column, but a date column could not map to a float column.

In various embodiments it is beneficial to support completely defined child CPL modules 305 as representing a reusable unit that may be employed in other CPL modules 300.

Figure 7:
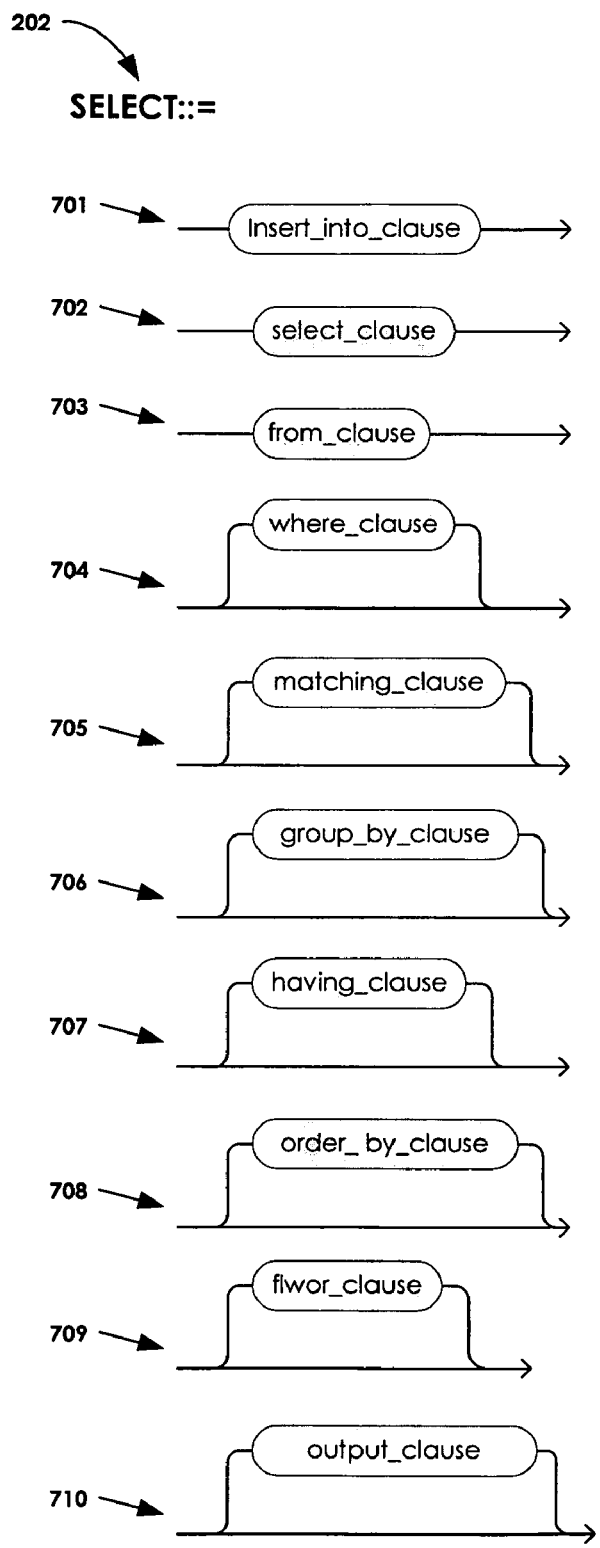
FIG. 7 illustrates a grammar for a SELECT statement.

The SELECT statement 202, depicted in FIG. 7, comprises the core grammar of all embedded query text and can include an INSERT INTO clause 701, a SELECT clause 702, FROM clause 703, WHERE clause 704, MATCHING clause 705, GROUP BY clause 706, HAVING clause 707, ORDER BY clause 708, FLWOR clause 709, and OUTPUT clause 710. Note that the grammar denotes clause names with a single continuous symbol using lower case letters and underscores to denote separate words.

FIG. 8 through FIG. 17, depict the detailed grammar for each of the primary clauses listed above and pictured in FIG. 7. The primary clauses (701 through 710) within a SELECT statement 202 employ novel approaches of description for representing new operational concepts on data streams. Embodiments may employ this grammar to govern the text in the QueryText element 615 of a top CPL module 300 or other child CPL Module 305.

Embodiments of the present invention may include expressions in clauses as a means to increase expressive capability as well as facilitate sophisticated representations. Embodiments may enable expressions to reference data streams, data stream columns, as well as represent logical operations, arithmetic operations, and functions on columns. Embodiments may also support expressions that understand various primitive data type values such as integers, floats, strings, Booleans, dates, and times. Different embodiments may support different primitive types and operations.

One embodiment of the present invention extends expression support to allow only a column name to be inserted in an expression when the context of the expression is clearly relative to only a single data stream. Otherwise expressions may require a fully qualified name in the form "aDataStreamName.aColumnName".

One embodiment of the present invention extends expression support to employ custom defined functions. One embodiment supports inclusion of custom defined functions by registering them via a CustomFunction.xml file that declares a <CustomFunction> XML element for each custom function which is of ComplexType FunctionMappingType. This XML element includes a <CallSignature> XML element, a <ExecutablePathName> XML element with the path name of a C DLL or Java JAR file, and a <FunctionName> XML element containing the function name or class/method name that will be employed to perform the actual processing.

One embodiment of the present invention extends expression support to employ XPATH expressions on a column declared with the XMLStringColumnType. In this case, standard expressions allow the inclusion of a substring adhering to the simple grammar XPath(anXMLString, anXPathExpression) anywhere in the expression.

One embodiment of the present invention extends expression support to employ XQuery expressions on a column declared with the XMLStringColumnType. In this case, standard expressions allow the inclusion of a substring adhering to the simple grammar XQuery(anXMLString, anXQueryExpression) anywhere in the expression.

Figure 8:
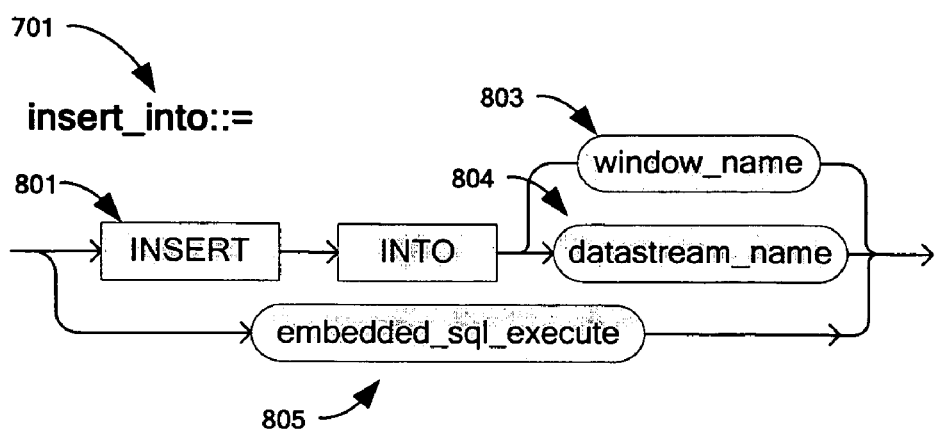
FIG. 8 illustrates a grammar for an INSERT INTO clause.

One embodiment of the present invention provides an INSERT INTO clause 701 as the initial clause in a SELECT statement 202 statement. The detailed INSERT INTO grammar shown in FIG. 8 depicts the INSERT 801 and INTO 802 keywords followed by either a window name 803 or data stream name 804. This clause represents that output results at runtime will be inserted into the window or data stream identified.

Figure 9:
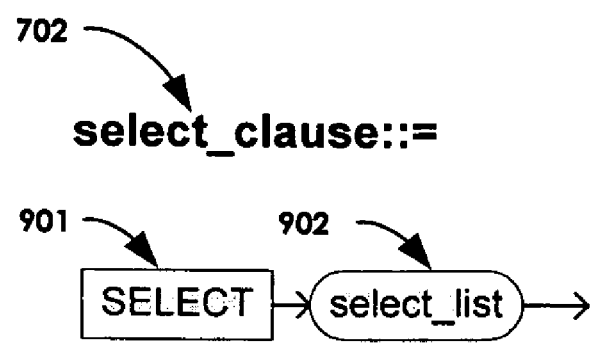
FIG. 9 illustrates a grammar for a SELECT clause.

One embodiment of the present invention provides a SELECT clause 702 as the second clause in a SELECT statement 202. FIG. 9 shows an embodiment where a SELECT clause comprises the SELECT keyword 901 followed by a select_list 902. The embodiment supports an asterisk form and a list form of the select_list 902.

Figure 10:
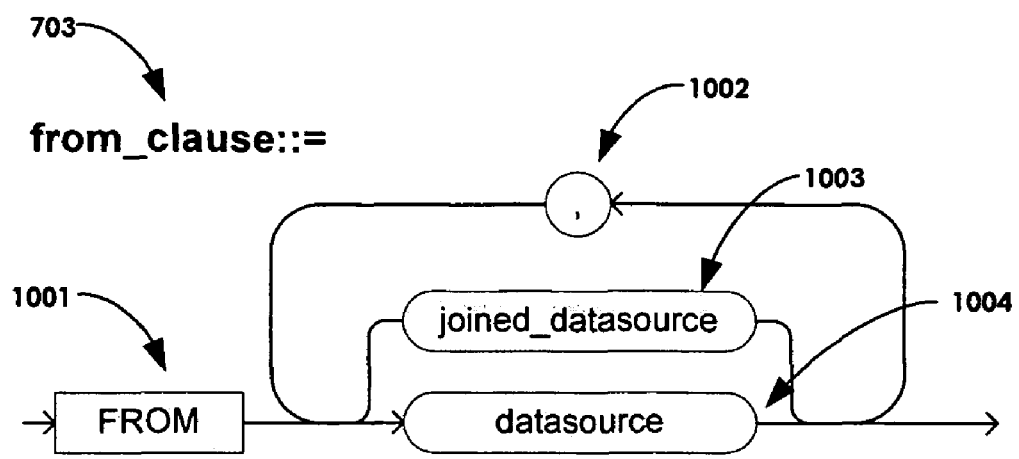
FIG. 10 illustrates a grammar for a FROM clause.

One embodiment of the present invention uses the single asterisk 2101 to represent that the output rows comprise columns equal to the union of all columns that are listed in the stream schemas of all source data sources 1002 identified in the FROM clause 703 pictured in FIG. 10.

Figure 21:
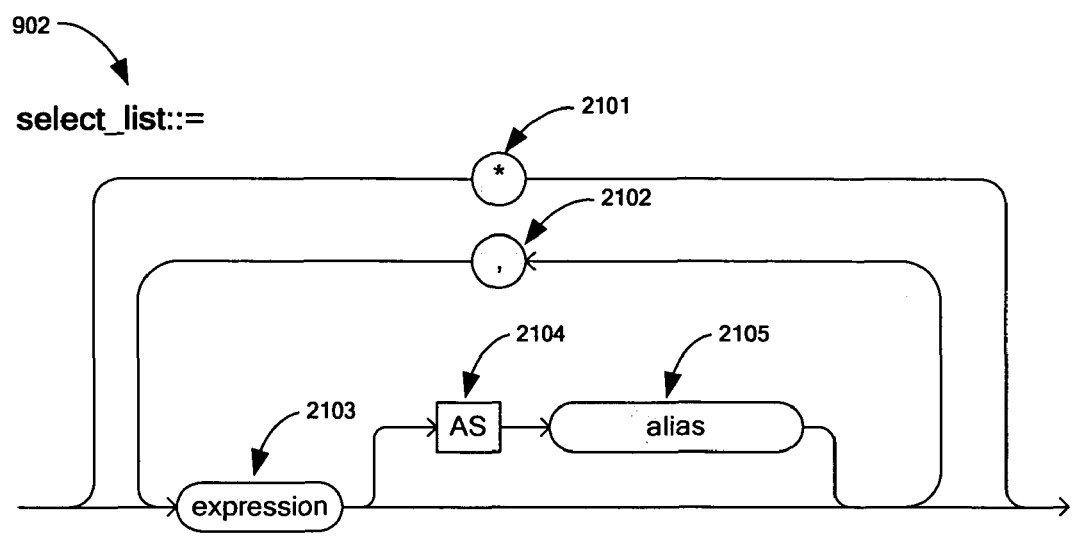
FIG. 21 illustrates a grammar for a select_list, a list of expressions, within a SELECT clause.

One embodiment of the present invention provides a select_list 902 that is a list of comma separated 2102 expressions 2103 as illustrated in the grammar of FIG. 21. Each expression 2103 may reference data stream columns as well as represent computations using operations and functions on the columns referenced. The list of expressions 2103 represents new rows of columns that are to be continuously computed and continuously output as a row result.

One embodiment of the present invention provides an AS 2104 subclause option adjacent to each expression 2103 that provides the means to declare an alias 2105 that is a name that can be beneficially employed in other expressions 2103 to refer to the computed value of the alias' 2105 associated expression 2103.

One embodiment of the present invention provides functions designated as aggregate functions which perform computations across rows satisfying the WHERE clause 704 condition. Embodiments may choose to support expressions with aggregate function calls such as AVG( ), COUNT( ), MAX( ), MEANDEVIATION( ), MEDIAN( ), MIN( ), STDDEVIATION( ), and SUM( ). These functions compute across all rows satisfying the WHERE clause 704 condition, average of an expression, count of expressions not null, max of expression, mean deviation of expression, median of expression, minimum of expression, standard deviation of an expression, and sum of an expression, respectively.

One embodiment of the present invention extends the COUNT( ) function call representation to support the representation of the function call COUNT(*) so that all rows in the result are counted even if their fields contain NULLs.

One embodiment of the present invention provides support to register aggregate custom functions. Aggregate custom functions employ extensions to the <CustomFunction> XML Element in the CustomFunctions.xml file. There are two additional child XML Elements, <TermIn> and <TermOut>, each of type FunctionMappingType. The <TermIn> function is called when a row meets the current conditions while the <TermOut> function is called when a row no longer meets the current conditions. Both functions are called with the value of the aggregated function call expression. The <CustomFunction> XML element itself then includes the main function to call when the current value of the aggregate function is to be retrieved. Embodiments may require additional parameters to be passed into these functions to support proper aggregate computation.

One embodiment of the present invention provides support for an expression comprising a single asterisk to denote that all columns of the source data stream are to be included in the output rows if they meet the WHERE clause 704 condition or the HAVING clause 706 condition if one is present.

Figure 22:
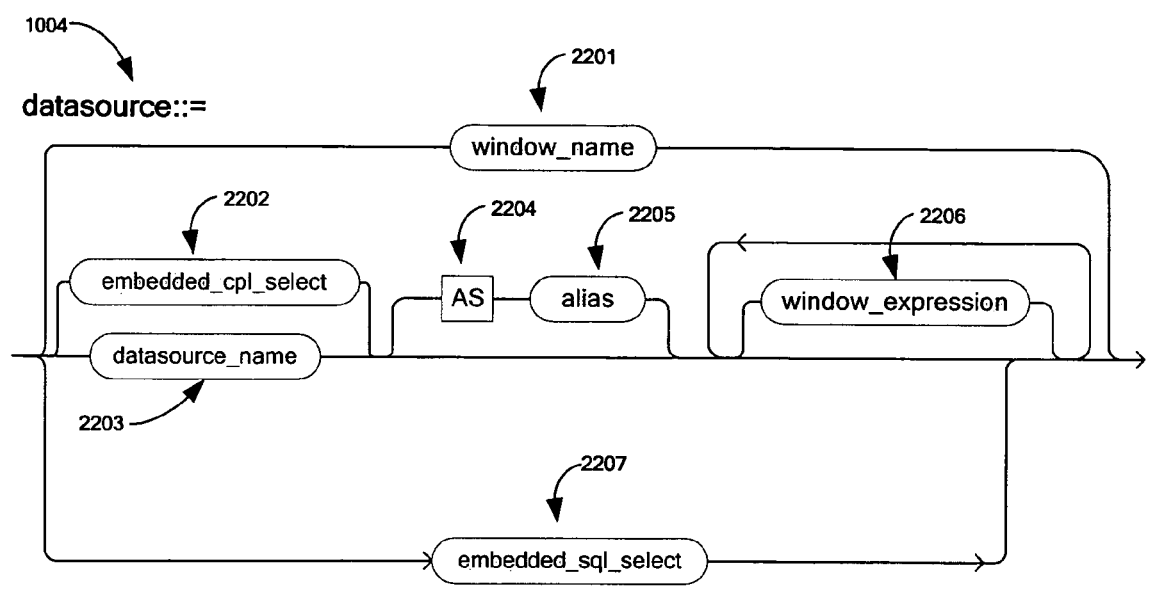
FIG. 22 illustrates a grammar for datasources.

One embodiment of the present invention provides a FROM clause 703 that, in its simplest form, provides a FROM keyword 1001 and includes declarations of the datasources 1004 that represent the source of all data to be continuously queried. The datasources 1004 are most often data stream names which are referenced in expressions within clauses throughout the entire query statement wherein both the listed data stream names and their columns may be referenced. As depicted in FIG. 10, however, a FROM clause 703 may actually include a list of comma separated 1002 joined_datasources 1003 and datasources 1004 in any order which each include a more sophisticated declaration for a datasource as depicted in FIG. 22.

Figure 24:
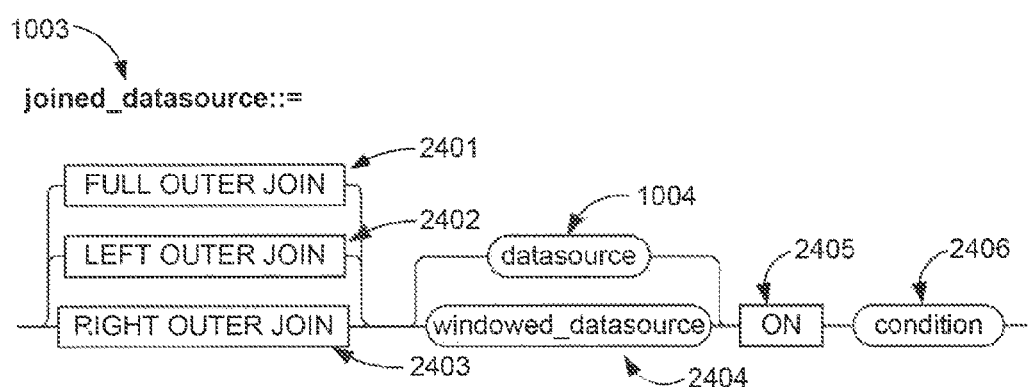
FIG. 24 illustrates a grammar for joined datasources.

One embodiment of the present invention provides support for joined_datasources 1003 shown in FIG. 24 where the datasources may be outer joined using one of the keyword groups FULL OUTER JOIN 2401, LEFT OUTER JOIN 2402, or RIGHT OUTER JOIN 2403. When an outer joined datasource is specified, one of the keyword groups listed above are followed by either a datasource 1004 or a windowed_datasource 2404, and concluding with an ON subclause (2405 and 2406) comprising an ON keyword 2405 followed by a condition 2406. To represent the outer join, embodiments will use the condition to represent an expression applied to another datasource or windowed_datasource 2404.

Embodiments may use the full outer join description to represent that output rows will include row data in the results even when the rows don't meet the join condition. Consider the first datasource declared the left datasource and the other datasource referenced in the condition, the right datasource. When processing a full outer join, rows in both datasources that meet the condition are included as result rows. Rows from the left datasource, that don't match, cause the select_list expressions to be computed with left datasource column values as normal, but all right datasource column values are NULL. Oppositely, Rows from the right datasource, that don't match, cause the select_list expressions to be computed with right datasources column values as normal, but all left datasource column values are NULL. Thus, all Rows produce results, wherein the non-matching Rows use NULLs as described.

Embodiments may use the left outer join description to represent that output rows will include only left datasource rows that don't match, while the right datasource rows that don't match are ignored. Thus, only left datasource columns will be computed with non-NULL values when producing output Rows on non-matching rows.

Embodiments may use the right outer join description to represent that output rows will only include right datasource rows that don't match, while the left datasource rows that don't match are ignored. Thus, only right datasource columns will be computed with non-NULL values when producing output Rows on non-matching rows.

Figure 25:
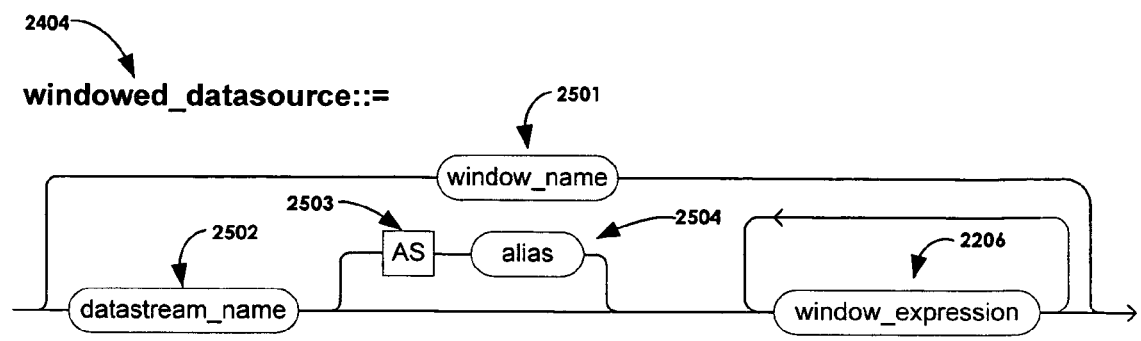
FIG. 25 illustrates a grammar for windowed datasources.

One embodiment of the present invention provides a windowed_datasource 2404 grammar as shown in FIG. 25 that supports a form which denotes a window_name 2501 that refers to a window declared in a previous CREATE_WINDOW statement 203.

One embodiment of the present invention provides a windowed_datasource 2404 grammar as shown in FIG. 25 that supports a form which denotes a datastream_name 2502 followed by a window_expression 2206. Embodiments may also include an optional alias designation using an AS keyword 2503 followed by the alias 2504.

One embodiment of the present invention constrains the outer join description to reference only two datasources wherein at least one or both of the datasources must be a windowed_datasource 2404. This allows the outer join processing to be more bounded since the processing time will be proportional to window sizes rather than potentially very large entire data streams.

Embodiments of the present invention may provide one or more rules within the datasource grammar for describing datasources. A typical embodiment will support simply listing the name of a datasource 2203 which is shown as the datasource_name grammar 2203 of FIG. 23.

Figure 23:
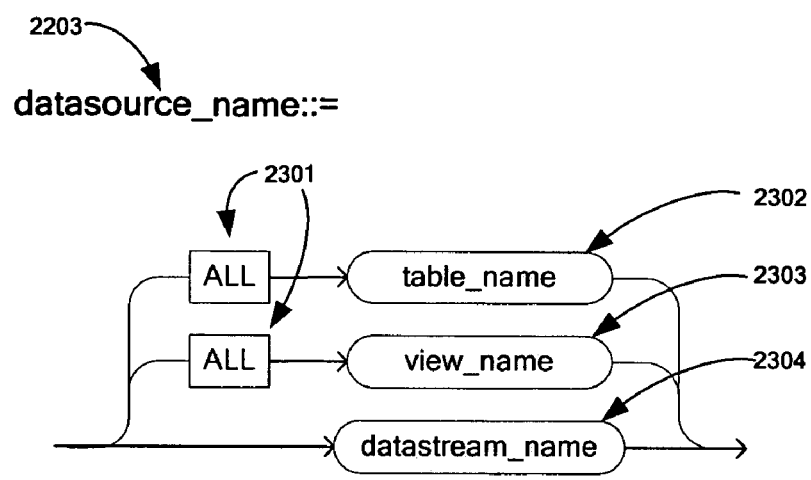
FIG. 23 illustrates a grammar for datasource names.

Whereas embodiments will typically use the datasource_name 2203 to refer to data streams using a datastream_name 2304, FIG. 23 shows that embodiments may support names of table 2302 and views 2303 from a relational database as well. When using a table_name 2302 or a window_name 2303, one embodiment employs the ALL keyword 2301 in order to have them represented as windows, like a data stream window, but the ALL denotes that every row in the table or view are to be included in the window.

One embodiment of the present invention provides a datasource 1004 that supports the option of declaring an existing window_name 2201. Such a window_name 2201 must have been previously established in a CREATE WINDOW statement 203.

One embodiment of the present invention provides a datasource 1004 that supports the option of declaring an embedded_cpl_select 2202 statement. Such a statement is identical to the SELECT statement 202 pictured in FIG. 7 except that it doesn't include the INSERT INTO clause 701, thus, representing another datasource since the SELECT statement 202 represents a query that produces rows.

One embodiment of the present invention provides a datasource 1004 that supports the option of declaring an embedded_sql_select 2207 statement. Such a statement represents a database SELECT statement query to one or more tables and views in a database.

One embodiment of the present invention provides a datasource 1004 that supports the option of defining a window of rows from a data stream. The representation of a data stream window employs the window subclause comprising a window_expression 2206. A window_expression 2206 may be as simple stating the number of recent rows, but alternate embodiments may represent more sophisticated window concepts.

Figure 26:
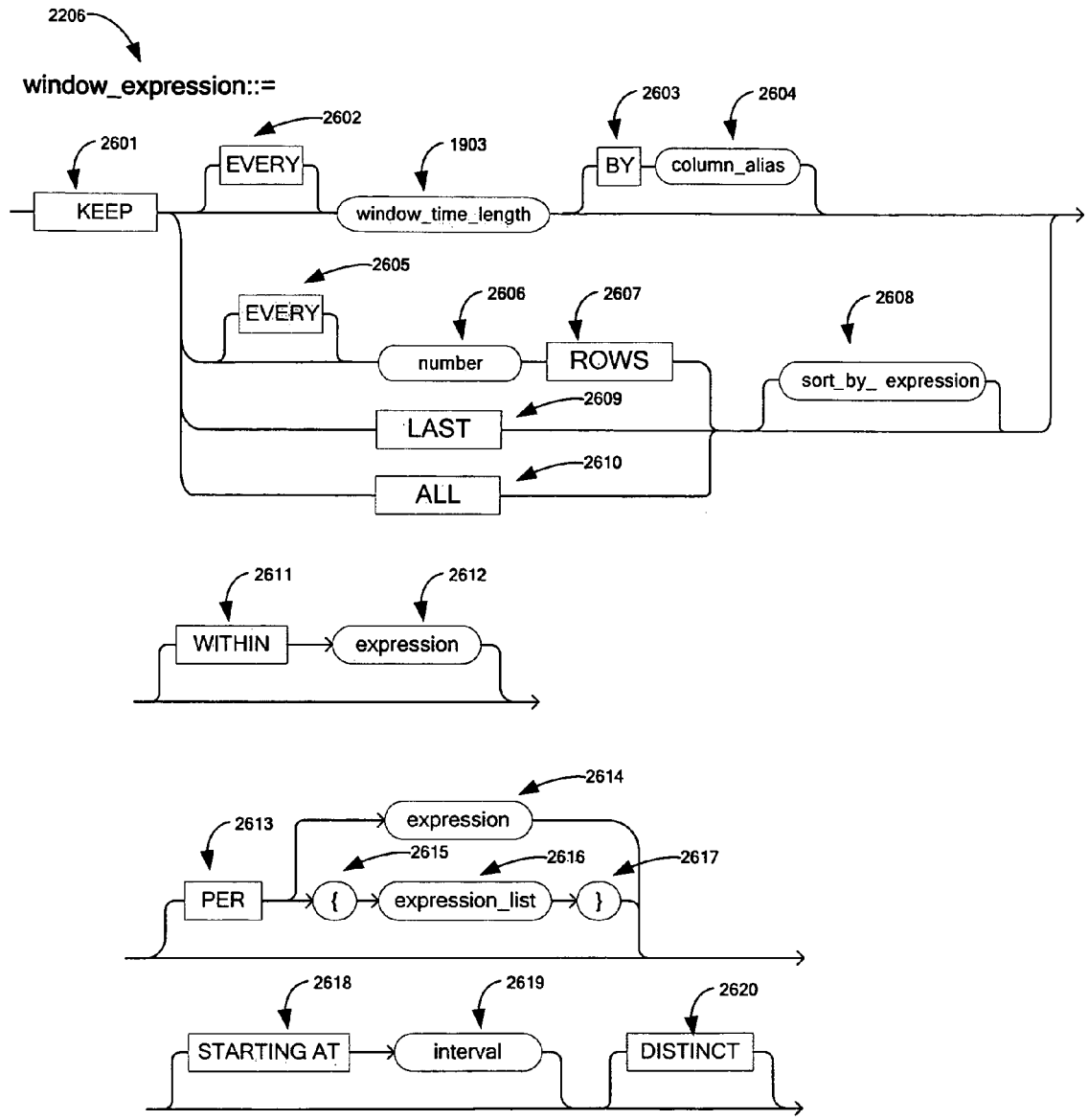
FIG. 26 illustrates a grammar for a window_expression or KEEP clause.

One embodiment of the present invention provides a window_expression 2206 adhering to the grammar illustrated in FIG. 26. This grammar allows the embodiment to describe sliding most recent row count windows, sliding most recent time interval windows, and recent fixed time interval windows which are always fixed to begin every round time interval length. The fixed time interval window concept represents the case where time may be carved into fixed non-overlapping but adjacent time intervals of a specified time interval length. A fixed time window always begins at the next fixed time interval boundary and grows in time length until its current end reaches the next time interval boundary.

Embodiments may employ the KEEP keyword 2601 for representing sliding most recent row count windows. In this case, the window_time_length 1903 subclause shown in detail in FIG. 27 is used with a simple integer number 2701 and the ROWS keyword 2702.

Embodiments may employ the KEEP keyword 2601 for representing sliding most recent time interval windows. In this case, the window_time_length 1903 subclause shown detailed in FIG. 27 is used with a simple integer number 2701 and one of the time unit keywords (2703 through 2710).

Figure 27:
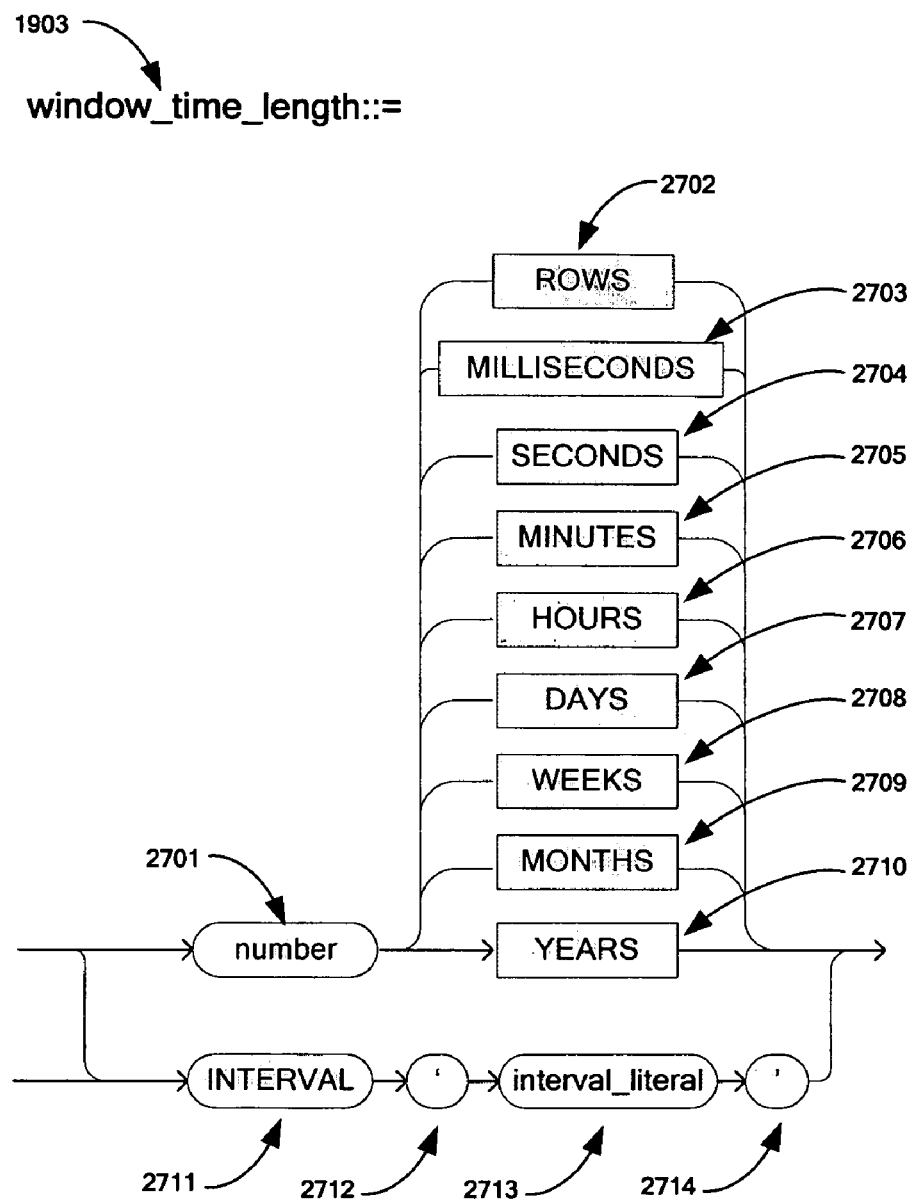
FIG. 27 illustrates a grammar for window time length.

Embodiments may extend the window_time_length 1903 subclause shown detailed in FIG. 27 with support for an INTERVAL clause (2711 through 2714). In this case, the INTERVAL keyword 2711 is followed by a single quoted enclosed (2712 and 2714) interval_literal 2713. Embodiments are free to choose the grammar for the interval_literal 2713, but one embodiment allows any sequence of pairs of number 2701 with either DAYS 2707, WEEKS 2708, MONTHS 2709, or YEARS 2710 to precede a substring of the form hh:mm:ss, where hh represents the number of hours from 0 to 23, mm represents the number of minutes from 0 to 59, and ss represents the number of seconds from 0 to 59. For example, an expression of the form INTERVAL '3 MONTHS 1 WEEKS 4 DAYS 06:30:00' is supported.

Embodiments may employ the EVERY keyword 2602 for representing recent fixed time interval windows. In this case, the window_time_length 1903 subclause shown detailed in FIG. 27 is used with a simple integer number 2701 and one of the time unit keywords (2703 through 2710).

One embodiment of the present invention provides an expression 2613 to follow the WITHIN keyword 2612 in order to support the option of defining a window by the rows that evaluate to "true" the Boolean expression defined in the expression 2613.

Figure 28:
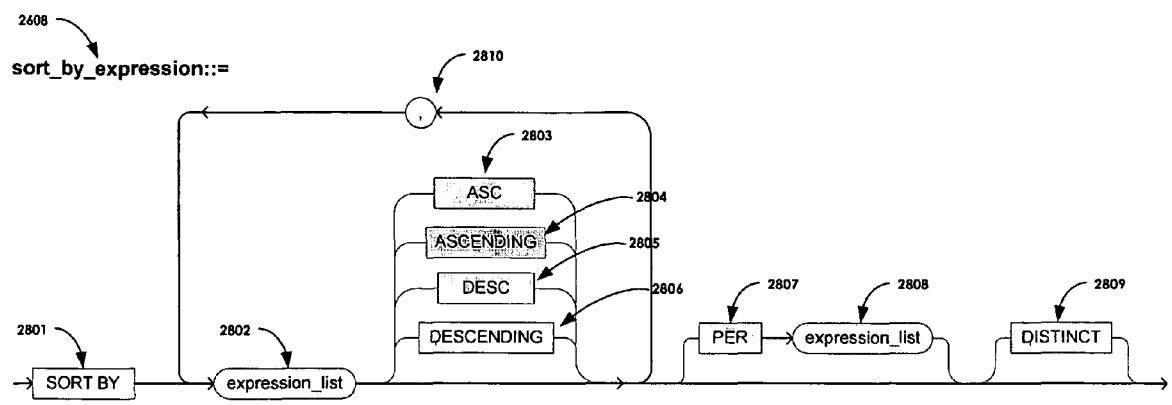
FIG. 28 illustrates a grammar for a SORT BY expression in a KEEP clause.

One embodiment of the present invention provides a sort_by_expression subclause 2609 option to support the representation of sophisticated sorting concepts within a window. The grammar of the sort_by_expression subclause 2609 is illustrated in FIG. 28 beginning with the SORT BY keywords 2801. An expression_list 2802 follows with a list of expressions on columns that are comma separated.

One embodiment of the present invention represents the sorting of rows in the current window so that they are sorted by the first expression first, by the second expression if the first expression of multiple rows is equal, and so on. The trend order of the rows kept in the current window descends or ascends relative to each expression 2802 based on their associated trend ascend or descend keyword indicated (2803 through 2806).

One embodiment of the present invention provides an optional PER subclause (2807 and 2808) in order to support the grouping of rows within the window by the expression_list 2808. With the inclusion of a PER subclause (2807 and 2808), rows with the same computed vector of values determined by the expression_list 2808 are grouped together. Each vector value is a PER group key. The SORT BY expression_list 2802 controls the order of the rows within each group.

One embodiment of the present invention provides an optional DISTINCT keyword 2809 to be used with the PER subclause and appended to the PER subclause. When the DISTINCT keyword 2809 is present, it represents that arriving rows to a window push out rows currently in the window that have the same vector value of the PER expression_list 2808.

Embodiments may employ the LAST keyword 2609 for representing sliding the most recent row. In this case, it is equivalent to having the clause KEEP 1 ROW, however, the determination of the last row is based on the sort_by_expression 2609.

Embodiments may employ the ALL keyword 26101 for representing inclusion of all rows that have arrived to a data stream. However, the sort_by_expression 2609 may be employed to order the rows.

One embodiment of the present invention provides support for a multiple-policy window subclause. window_expressions 2206, represented as KEEP 2601 subclauses are listed one after the other as pictorially denote by the circular arrow about the window_expression bubble 2206 in FIG. 26. For example, a multi-policy window may comprise a sliding most recent row count windows and a sliding most recent time interval window. Such a multi-policy would cause only the number of rows to be kept in the window specified by the first policy, and only if they had arrived within the time interval specified by the second policy. Other examples could comprise more than two policies.

Whereas embodiments will typically use the datasource_name 2203 to refer to data streams using a datastream_name 2304, FIG. 23 shows that embodiments may support names of table 2302 and views 2303 from a relational database as well. When using a table_name 2302 or a view_name 2303, one embodiment employs the ALL keyword 2301 in order to have them represented as windows, like a data stream window, but the ALL 2301 denotes that every row in the table or view are to be included in the window.

Embodiments supporting subqueries may consider extending the grammar of a subquery to refer to columns of the containing query.

Embodiments supporting subqueries may consider introducing a substring containing an embedded_cpl_select 2202 to replace any position in an expression that takes a scalar when the embedded query is intended to return a scalar. For example, queries calling aggregate functions like COUNT( ) or SUM( ) return a scalar.

Figure 11:
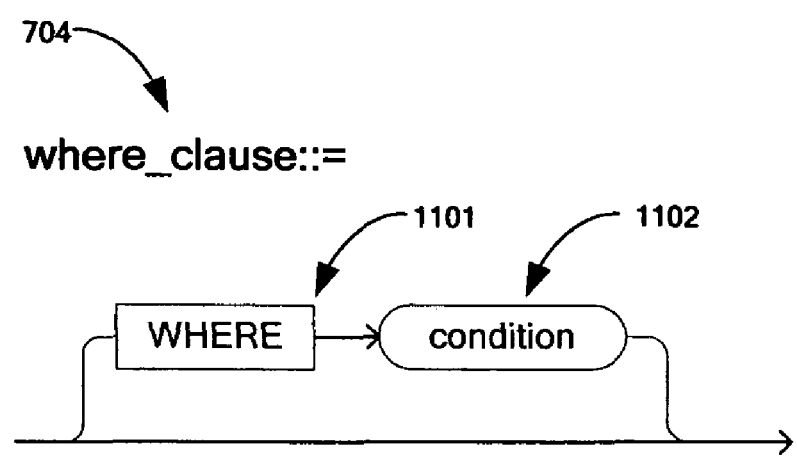
FIG. 11 illustrates a grammar for a WHERE clause.

One embodiment of the present invention provides a where_clause 704 as depicted in FIG. 11 that declares the condition which must be true for rows to appear in the output data stream. The where_clause 704, begins with the WHERE keyword 1101 followed by a condition 1102. Embodiments will provide expressions that reference columns in data streams and tables or windows.

One embodiment of the present invention extends the where_clause 704 to represent an outer join in its condition 1102 with the use of a "(+)" denoted after a window_expression 2206, table_name 2302, or view_name 2303. This represents that rows will be output to the destination with column values of the denoted window, table, or view even when the joined object doesn't have any rows with that column value.

In one embodiment, the present invention provides support for all expressions to reference the immediate previously arrived row. Expressions may insert the substring "PREV" preceding a data stream or data stream window datasource_reference to refer to a row that is 1 from the end. The data stream or data stream window should be in parenthesis as in "PREV(StockTrades)". For data streams the selected previous row is based on the time of arrival of the rows while for windows it is based on the time of arrival of the rows unless an order is established by the SORT BY subclause. The utilization of referring to previously arrived rows in expressions is particularly useful in where_clause 704 conditions 1102.

One embodiment the present invention provides support for all expressions to reference any previously arrived row. Expressions may insert the substring "[anIntegerIndex]" following a data stream or data stream window datasource_reference to refer to a row that is in the anIntegerIndex-th position from the end. For data streams this is based on the time of arrival of the rows while for windows it is based on the time of arrival of the rows unless an order is established by the SORT subclause. The utilization of referring to previously arrived rows in expressions is particularly useful in where_clause 704 conditions 1102.

Figure 18:
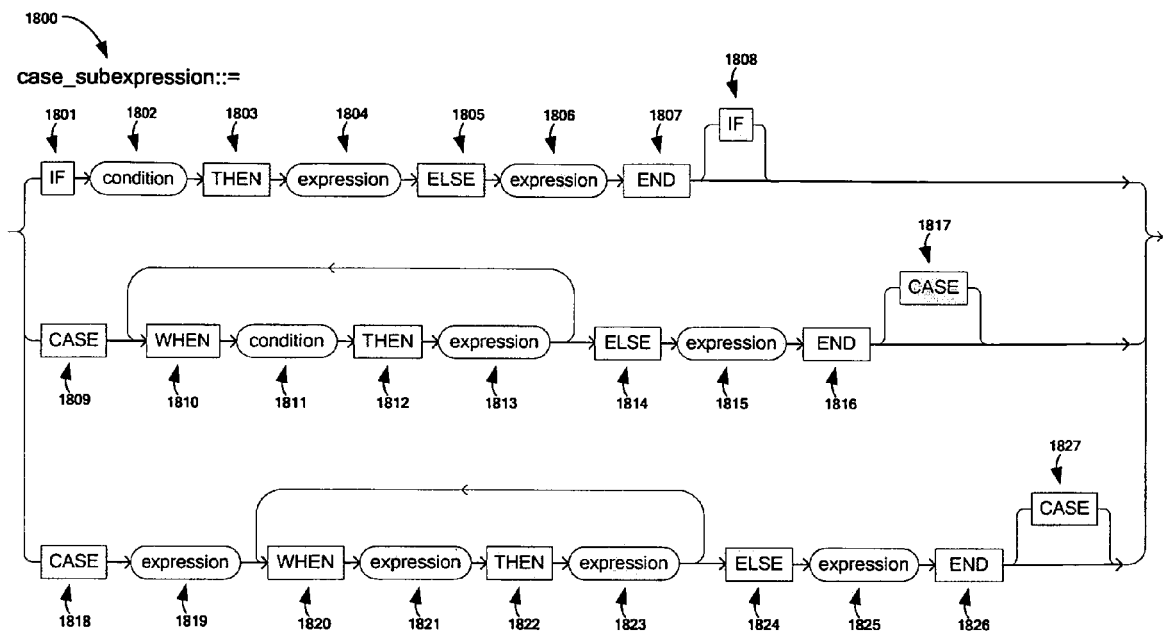
FIG. 18 illustrates a grammar for a CASE subexpression.

In one embodiment, the present invention provides support for all expressions to insert a case subexpression as depicted in the grammar of FIG. 18. The case_subexpression 1800 includes one of three forms. The first form (1801 through 1808) represents a simple IF expression 1801 form including a simple If-THEN-ELSE structure. This form represents that the THEN 1803 expression 1804 will be performed when the IF expression 1801 is true, otherwise the ELSE 1805 expression 1806 will be performed.

An alternative embodiment (1809 through 1817) includes a CASE form comprising a CASE-WHEN-THEN structure followed by a single ELSE 1814 expression 1815. With this form, the WHEN-THEN clause (1810 to 1813) may be repeated any number of times. In this form, each WHEN 1810 expression 1811 represents a Boolean expression that must be true in order to perform the corresponding THEN 1812 expression 1813. However, the representation is order dependent so that the first WHEN 1810 expression 1811 that is true at runtime is the only one that performs its corresponding THEN 1812 expression 1813. If none of the WHEN 1810 expressions 1811 are true, only then is the ELSE 1814 expression 1815 performed. The case_subexpression is also beneficial in the construction of where_clause 703 conditions 1102.

The embodiment's third form (1818 through 1827) represents a switch-like form where the value of the first or case expression 1819 represents the determination of which WHEN clause 1820 is chosen. If none of the WHEN expressions 1821 represent the value of the case expression 1819 at runtime, then the ELSE expression 1825 represents what to perform.

Figure 12:
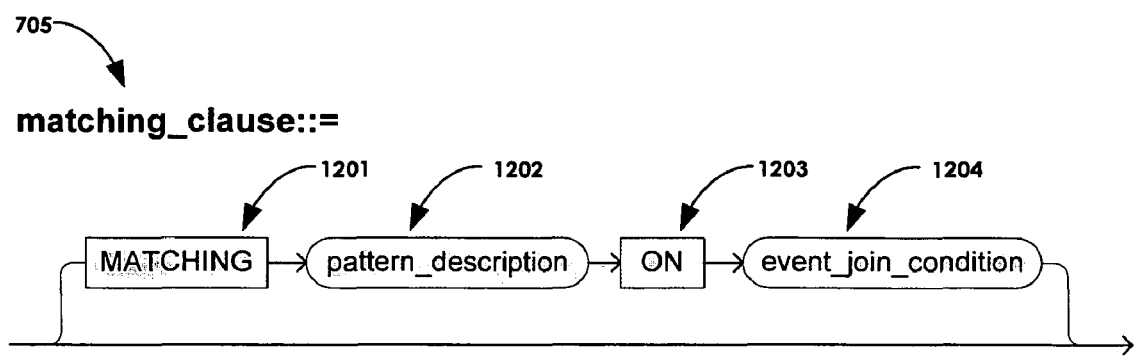
FIG. 12 illustrates a grammar for a MATCHING clause.
Figure 31:
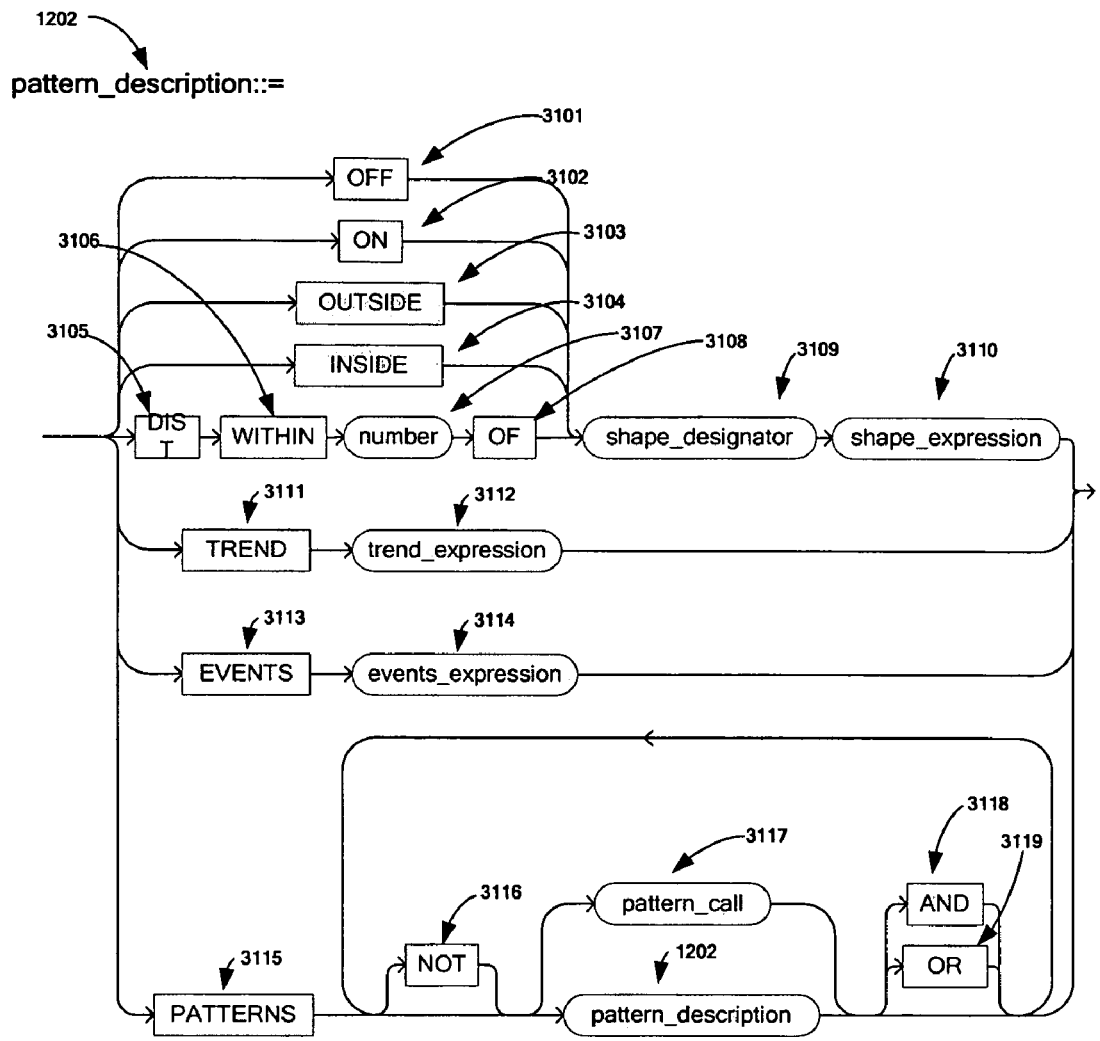
FIG. 31 illustrates a grammar for a pattern description.

One embodiment of the present invention provides a matching_clause 705 in FIG. 12, which represents the description of a pattern that rows must match. The matching_lause 705 includes the MATCHING keyword 1201 followed by a pattern_description 1202, ON 1203 keyword, and event_join_condition 1204. FIG. 31 depicts one embodiment of the grammar of a pattern_description 1202. The pattern_description 1202 represents a sequence of rows where the rows meet specific characteristics for constituting a pattern. Meanwhile, this sequence of rows must also adhere to the event_join_condition 1204 in the ON subclause (1203 and 1204) For example, the ON 1203 condition 1204 can specify that all of the rows in the pattern must have a specific value for a specific column.

Figure 13:
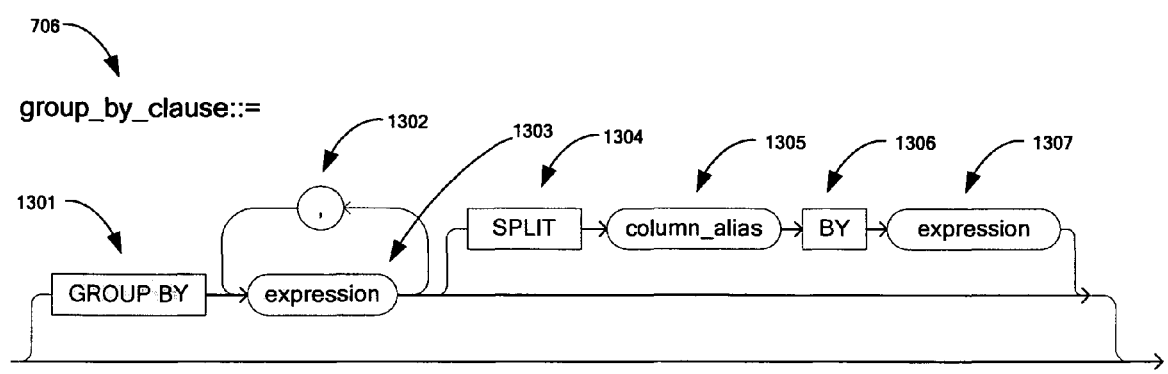
FIG. 13 illustrates a grammar for a GROUP BY clause.

One embodiment of the present invention provides a group_by_clause 706 in FIG. 13, which represents the aggregation of rows that share identical values for an expression. The group_by_clause 706 includes the GROUP keyword 1301 followed by a list of comma separated 1302 expressions 1303. The group_by_clause 706 represents aggregation of rows sharing identical values of the vector value formed by computing each of the expressions 1303 in the comma 1302 separated list. This representation is intended to work in conjunction with the aggregate function calls described earlier. For example, COUNT( ) in a SELECT clause 702 select_list 902 will provide the count of the number of rows for each row group based on each expression 1303 in the group_by_clause 706. Queries with a group_by_clause 706 produce output rows that contain a single row with any aggregate computation. In the COUNT( ) example, a single row would be produced with a COUNT( ) for each group of rows sharing an identical GROUP BY expression 1303 value.

Sophisticated embodiments of the present invention will extend the group_by_clause 706 with a SPLIT BY subclause (1304 through 1307). This subclause represents the break up of a single row into multiple rows based on the value of the identified column_alias 1305 and an expression 1307 upon the column_alias 1305. For example, while rows representing stock trades will typically be grouped by the stock traded, some traders desire to look at the data where stock trades are assembled into same size volume subgroups. In this case, a SPLIT BY expression 1307 such as SUM(volume)<=1000 with the "volume" column_alias, will break up rows so that they represent exactly 1000 shares traded regardless of the original distribution of share size in trades.

Figure 14:
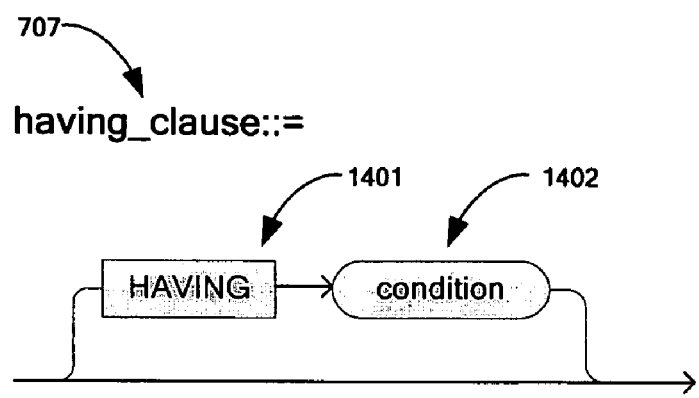
FIG. 14 illustrates a grammar for a HAVING clause.

One embodiment of the present invention provides a having_clause 707 in FIG. 14, that represents a filter condition 1402 on the group_by_clause 706 in order to filter based on aggregate function calls. The having_clause 707 includes the HAVING keyword 1401 followed by the condition 1402 expression. An example beneficial use of the having_clause 707 is to filter out a stock in further analysis because its volume is too low. The condition SUM(shares)>10000 removes rows in the output for stocks grouped by their symbol which have not traded at least ten thousand shares.

Figure 15:
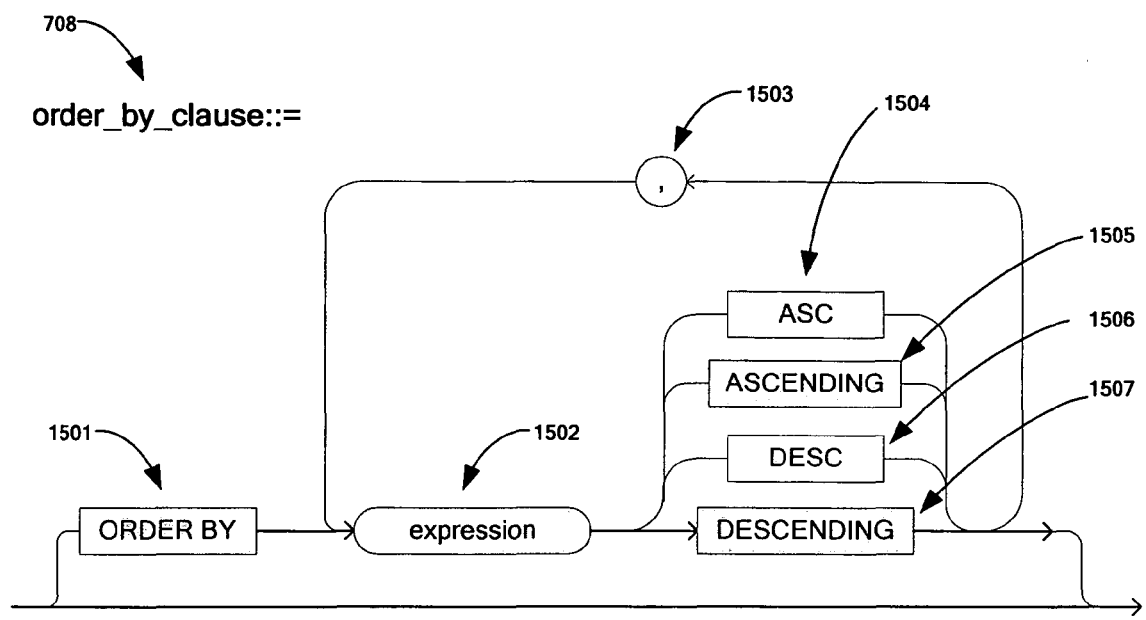
FIG. 15 illustrates a grammar for an ORDER BY clause.

One embodiment of the present invention provides an order_by_clause 708 in FIG. 15, for representing the order that output rows are to be sent to the destination. The ordered representation is intended only for rows meeting the WHERE clause 704 condition as well as a HAVING clause 706 if one is present, which will be ordered by the expression 15 given. The representation of the trend of the ordering is governed by a trend designator (1504 through 1507). The trend choices are for either ascending or descending order.

One embodiment of the present invention extends the order_by_clause 708 in FIG. 15, with support for multiple expressions to order by. The second expression 1502 in the list is used to order rows that share the same value of the first expression. The third expression 1502 in the list is used to order rows that share the same value of the second expression in the list and so on. An example of the use of the ORDER BY clause 707 is with the OUTPUT EVERY clause 709. In this case, the OUTPUT EVERY clause 709 will not only govern the periodicity of rows being output to a destination data stream, but it will govern the sequential order that they are submitted based on the expression list of the ORDER BY clause 707.

Figure 16:
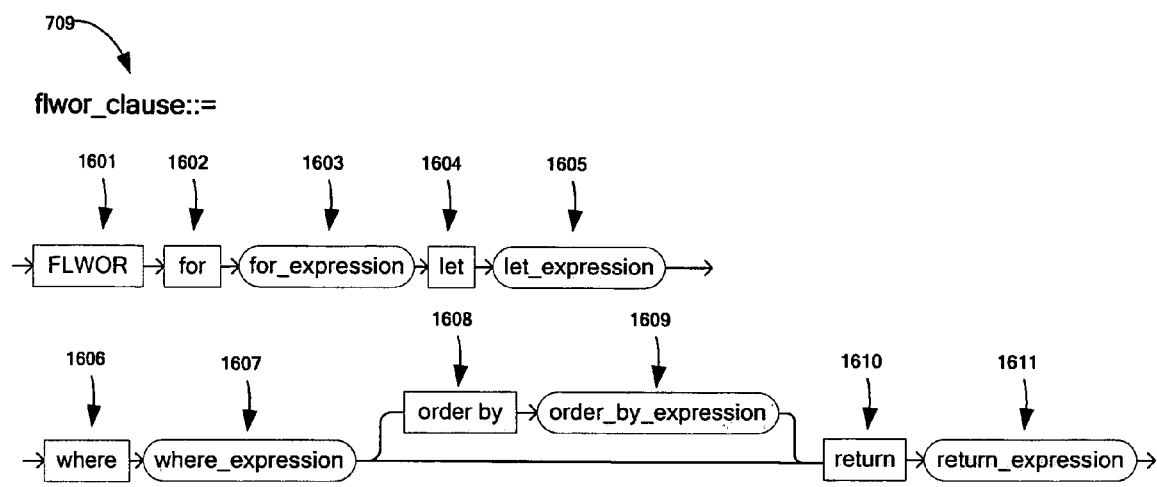
FIG. 16 illustrates a grammar for a FLWOR clause.

One embodiment of the present invention provides a flwor_ clause 709 FIG. 16, that includes an XQuery procedure to be listed to take place on one or more columns of type XMLString. The flwor_clause 709 begins with the FLWOR keyword 1601 and is followed by the same grammar and syntax for XQuery procedures. However, embodiments minimally need to augment XQuery FLWOR procedure expressions to support stream objects.

One embodiment of the present invention extends the FLWOR procedure expressions to use "stream" in addition to the use of "document" to denote a reference to a stream object. For example, in the statement "for $po in stream (POs)/PO", a stream object, rather than a document object is referred to.

One embodiment of the present invention extends the FLWOR procedure expressions to include support for window expressions as in "stream(POs) within 10 min".

One embodiment of the present invention extends the FLWOR procedure expressions to reference previous rows using the [ ] operator to denote the i-th ago row.

Figure 17:
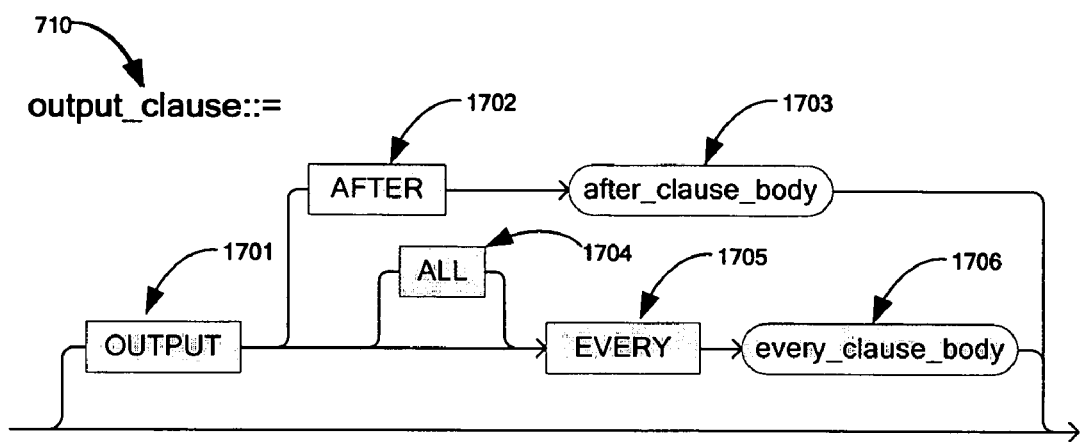
FIG. 17 illustrates a grammar for an OUTPUT clause.

One embodiment of the present invention provides an output_clause 710 in FIG. 17 that represents different forms of output control.

Figure 19:
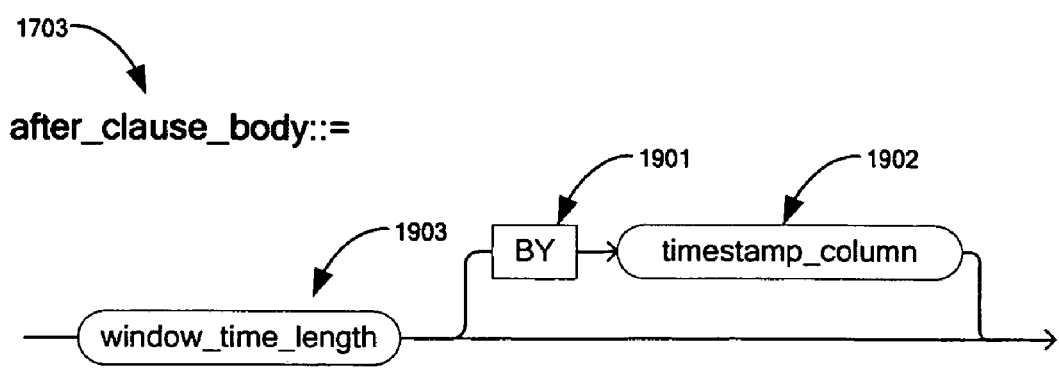
FIG. 19 illustrates a grammar for an OUTPUT AFTER clause body.

One embodiment of the present invention provides an OUTPUT AFTER clause (1701 through 1703) in FIG. 17 that employs the after_clause_body 1703 shown in FIG. 19. that represents a delay that rows satisfying the conditions for output will be delayed by. The delay can be row-based or time-based which is determine by the use of window_time_length 1903. The delay will be based on a number 2701 of rows if the ROWS designator 2702 is used in the window_time_length 1903, otherwise the delay is time-based using one of the time unit designators (2703 through 2710). The INTERVAL subclause may also be used to specify the delay (2711 through 2714).

One embodiment of the present invention provides an optional BY subclause (1901 and 1902) to allow the time delay designation to be based on a more general timestamp or time_expression 1902. For example, users may find that an alternate column containing a timestamp that was added to a data stream is more suitable.

Figure 20:
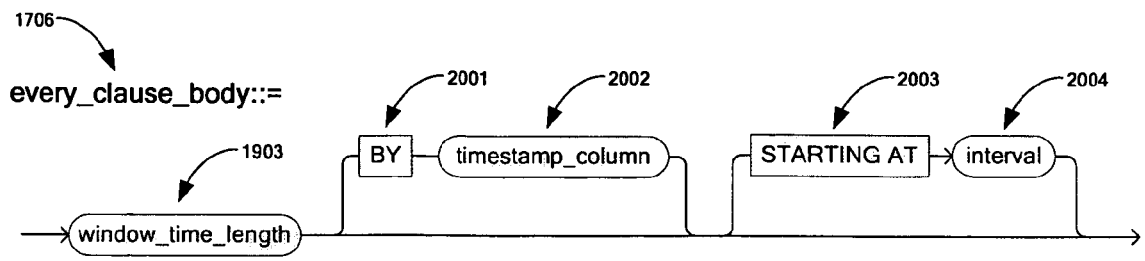
FIG. 20 illustrates a grammar for an OUTPUT EVERY clause body.

One embodiment of the present invention provides an OUPUT EVERY clause (1701, 1704 through 1706) in FIG. 17 that employs the every_body_clause 1706 shown in FIG. 20 that represents a frequency that rows should be produced to the output. An OUTPUT EVERY clause (1701, 1704 through 1706) includes the OUTPUT EVERY keywords (1701, 1704) followed by a window_time_length 1903 that represents a frequency designation for output. The two types of frequency designations are row-based and time-based. An output row will be produced at each point that the frequency designation is met. With the ROWS 2702 designator, an output row is produced every time the number 2701 of rows declared arrive. The rest of the frequency designators (2703 through 2710) are time-based. With the time-based designators, an output row is produced each time period that goes by equal to the time interval designated by the number 2701 and the time unit (2703 through 2710) selected, or an INTERVAL subclause (2711 through 2714). For example, using a number and time unit such as "15 8 MILLISECONDS" will produce an output row every 0.158 seconds.

One embodiment of the present invention represents that the OUTPUT EVERY clause (1701, 1704 through 1706) will not produce any output for time intervals that had no rows arriving.

One embodiment of the present invention extends the OUTPUT EVERY clause (1701, 1704 through 1706) with an optional BY subclause (2001 and 2002) to allow time-based frequency designators to be based on a more general timestamp or timestamp_column 2003. For example, one can introduce a delay by adding a time to the timestamp column. Users may also find that an alternate column containing a timestamp that was added to a data stream is more suitable. The alternate timestamp could also have a delay added. When using artificial data streams in simulators, the time expression could include evaluation of a random time increment based on one of the well-known arrival distribution such as Poisson. This would allow the simulated data stream to produce output based on timestamps that are actually occurring much faster than real-time. The utilization of this expression has similar benefits to its use with the OUTPUT AFTER clause (1701 through 1703).

One embodiment of the present invention extends the OUTPUT EVERY clause (1701, 1704 through 1706) with an optional BY subclause (2001 and 2002) to denote that a timestamp_column 2002 should be overwritten with the precise frequency output time as rows are output.

One embodiment of the present invention maintains the synchronization specified by the OUTPUT EVERY clause (1701, 1704 through 1706) with the use of the OUTPUT AFTER clause (1701 through 1703). When both clauses are employed simultaneously, delayed output rows won't appear until the next time interval specified by the OUTPUT EVERY clause (1701, 1704 through 1706). This is because typical embodiments will employ the OUTPUT EVERY clause (1701, 1704 through 1706) for synchronizing data streams wherein the synchronization must be maintained.

Figure 29:
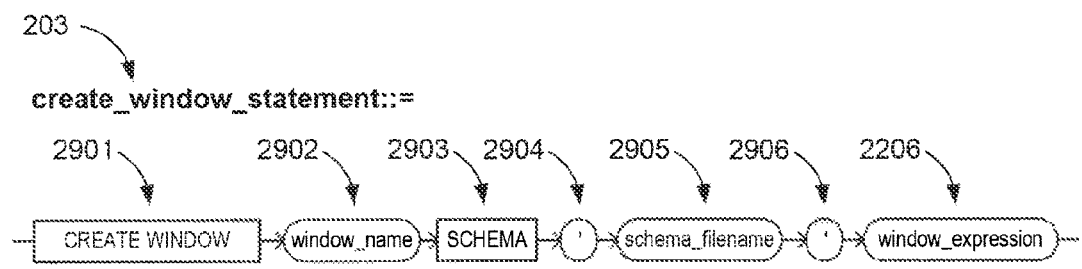
FIG. 29 illustrates a grammar for a CREATE WINDOW statement.

One embodiment of the present invention provides a create_window_statement 2900 in FIG. 29, in order to support standalone reusable views on data stream windows. The statement includes the CREATE and WINDOW keywords 2901, followed by the window_name 2902, which is followed by the SCHEMA keyword 2903 and a single quote (2904 and 2906) enclosed schema_fileneme 2905, and concludes with a window_expression 2206. Since embodiments are expected to maintain the standalone window in a global namespace, the window may be referenced by any other CPL queries 700.

Figure 30:
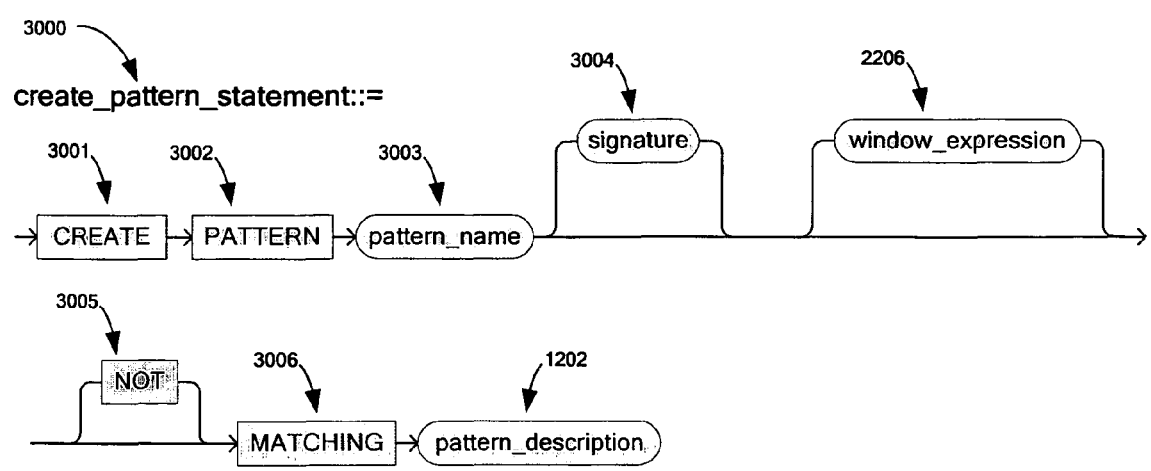
FIG. 30 illustrates a grammar for a CREATE PATTERN statement.

One embodiment of the present invention provides support for the description of patterns and the recognition of them. One pattern-aware embodiment includes in its grammar, a create_pattern_statement 3000 as shown in FIG. 30. This statement begins with the CREATE and PATTERN keywords (3001 and 3002), followed by pattern_name 3003, an optional signature 3004, a window_expression 2206, an optional NOT keyword 3005, the MATCHING keyword 3006, and then concludes with a pattern description 3007. The signature 3004 allows parameterization of variables in the expressions located in the CREATE PATTERN statement 3000.

One embodiment of the present invention provides a pattern_description 1202 grammar, shown in FIG. 31, that can represent a pattern using one of the four forms depicted (3101 through 3119). Embodiments may choose to implement the representation of none, some, or all of these pattern descriptions. Embodiments may also employ different descriptive grammars for representing the same patterns, and may even support additional patterns.

One embodiment of the present invention provides a window_expression 2206 in the CREATE PATTERN statement 3000. This optional clause allows the embodiment to represent patterns which occur within a most recent row count window or a most recent time interval window.

One embodiment of the present invention provides an optional NOT designator 3005 to denote that the MATCHING pattern is equivalent to when the pattern described does not occur. The employment of the NOT designator 3005 is useful when representing patterns describing negative events within a time interval. In such a representation, the window_expression 2206 and NOT designator 3005 work together to denote that the pattern description is not to occur within the time interval described.

One embodiment of the present invention provides a pattern_description 1202 with a shape relationship form (3101 through 3110) of description. This form begins with a relationship designator (3101 through 3108), followed by a shape_designator 3109, and concluding with a shape_expression 3110. As shown, the shape relationship can be one of OFF 3101, ON 3102, OUTSIDE 3103, INSIDE 3104, and DIST WITHIN OF (3105 through 3108). Embodiments may determine that other relationships may be introduced. The shape_designator 3109 is the name of the shape to use. Some examples are POINT, LINE, CURVE, POLYGON, CIRCLE, ELLIPSE, SQUARE, TRIANGLE, CUBE, SPHERE, CYLINDER, and TUBE. Embodiments may choose to implement none, some, or all of these shape designators. The shape_expression 3110 that follows the shape_designator 3109 may adhere to a grammar that is distinct for each distinct shape_designator 3109. For example, with a POINT shape designation, only an X expression and a Y expression are expected. For a CIRCLE or SPHERE shape designation, both a center point X expression, Y expression, Z expression (for SPHERE), followed by a radius expression is necessary. Other shape designations will use lists of expression that appropriately define the exact dimensions and characteristics of the particular shape. The OUTSIDE 3103 and INSIDE 3104 relationship designators may only be used with closed curves or surfaces. The OFF 3101 and ON 3102 relationship represent whether or not the pattern describes being exactly on the curve or surface defined. The DIST WITHIN OF (3105 and 3108) relationship represents that the pattern includes points that are within the specified distance from the shape described.

One embodiment of the present invention provides a pattern_description 1202 with a trend description form (3111 and 3112). The form begins with the TREND keyword 3111, followed by a trend_expression 3112. The trend_expression 3112 describes how the value of an expression behaves. Embodiments may choose to employ any trend describing keywords, but some examples are INCREASES, DECREASES, CROSSES, and ANGLEOF. For example, one embodiment allows a trend expression such as "price INCREASES 5 ROWS THEN DECREASES" in order to describe a rising price value for 5 rows followed by a decrease on the $6^{th}$ arriving row. When using parameterization of patterns, the same example parameterized is the statement "CREATE PATTERN SuddenFall(value, N) MATCHING value INCREASES N ROWS THEN DECREASES". The original example could then be denoted with "SuddenFall (price, 5) when referred to in a subsequent expression. The use of CROSSES refers to a stream of column values that mathematically form a curve that crosses another stream of column values. Finally, embodiments will benefit from the use of the ANGLEOF keyword which represents the angle formed by the last value of an expression, the second to last value, and the third to last value. Trend expressions are also free to use logical operators.

One embodiment of the present invention provides a pattern_description 1202 with an events description form (3113 and 3114). The form begins with the EVENTS keyword 3113, followed by an events_expression 3114. The events_expression 3114 describes a sequence of events where an event is either the arrival of a row at a named data stream, a change to a named standalone view, or a named matched pattern. An event expression adheres to a grammar that includes the comma (,), ampersand (&), pipe (|), caret (^), and exclamation point (!) as operators. A,B means that event B follows event A. A&B means that event A and B may occur in any order but they must occur. A|B means that one or more of event A and event B must occur but at least one must occur. A^B means that only one of event A and event B can occur but one or the other must occur. !A means that the event does not occur. Embodiments may choose to implement none, some, or all of these operators. Embodiments may also employ different operators or grammars for representing the same event sequences, and may even support additional event sequence descriptions.

One embodiment of the present invention extends the events_expression 3114 by beginning with a time interval declaration, followed by a colon, which is then concluded with the event pattern that must occur within the specified time interval. One syntax used is to enclose this entire events_expression 3114 in square braces. One syntax used is to employ the square braces with no EVENTS keyword 3113. The grammar is [time interval:event pattern]. When using a time declaration, the exclamation point operator means that the event does not occur within the time interval specified.

One embodiment of the present invention provides a pattern_description 1202 with a multiple patterns expression form (3116 through 3119). The form begins with the PATTERNS keyword 3115, followed by list of pattern_calls 3117 and/or pattern_descriptions 1202. A pattern_call 3117 includes the name of a pattern along with expressions placed in its call signature 3004. These calls and descriptions may be connected with logical operators (3116, 3118, and 3119) to describe a new pattern that represents the combination of other patterns. Use of pattern_calls 3117 will be particularly beneficial to those requiring generous reuse of already defined patterns.

Figure 32:
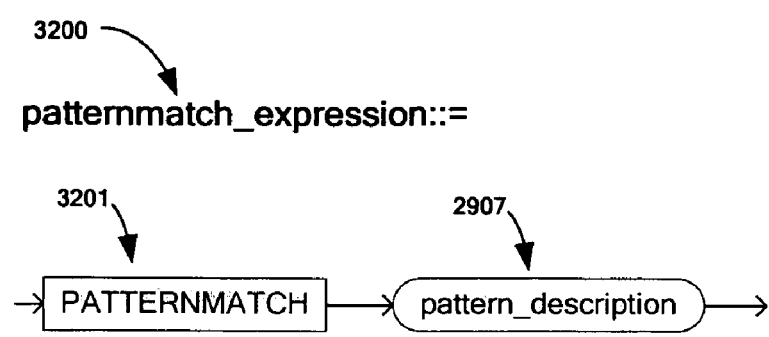
FIG. 32 illustrates a grammar for PATTERNMATCH clause that can be used in various expressions to match patterns.

One embodiment of the present invention provides a patternmatch_expression 3200 in FIG. 32, that may be employed in the expression describing any where_clause 704 condition 1102, having_clause 707 condition, or any expression 2613 within a window_expression 2206. The patternmatch_expression 3200 begins with the PATTERNMATCH keyword 3200 followed by a pattern_description 1202. Since a PATTERNMATCH expression is just like any other subexpression, it may enjoy the use of logical operators to AND and OR multiple PATTERNMATCH expressions together or with other expressions. Note that PATTERNMATCH expression use in a window_expression 2206 may be advantageously employed to represent that rows in a window may only remain in the window as long as each row adheres to the pattern referenced or the pattern described.

Figure 33:
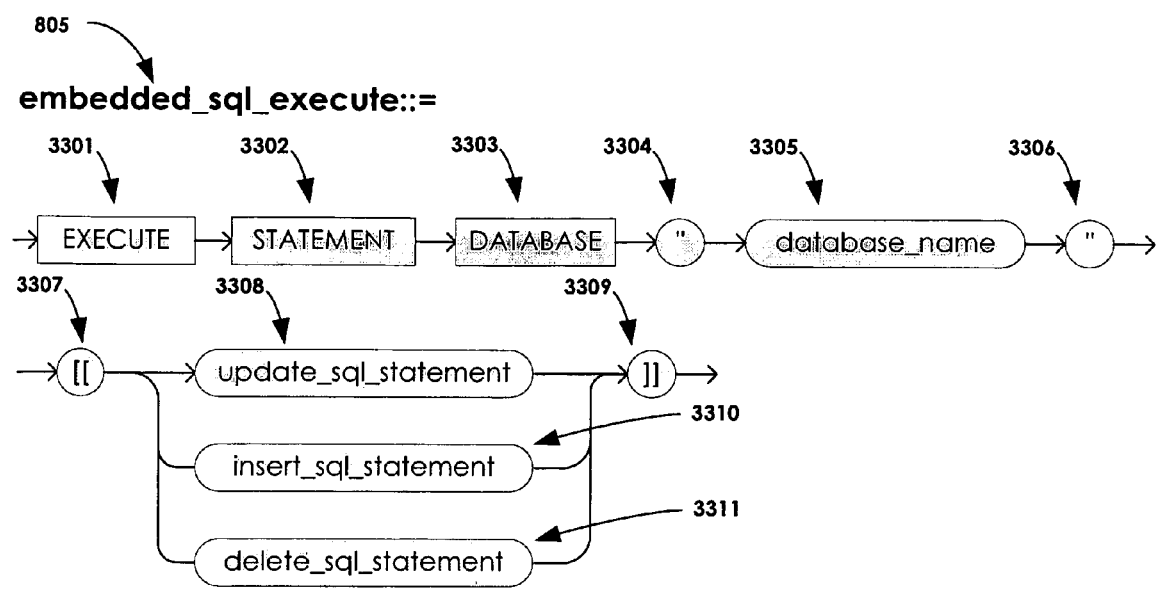
FIG. 33 illustrates a grammar for an embedded SQL execution statement for update, insert, or delete.

One embodiment of the present invention provides grammar for the embedded_sql_execute 805 as illustrated in FIG. 33. The clause begins with the EXECUTE 3301, STATEMENT 3302, and DATABASE 3303 keywords. This is followed by the name of the database (database_name 3305) enclosed in double quotes (3304, 3306). This establishes the source database for the operation to execute. The actual embedded execution statement may be either an UPDATE, INSERT, or DELETE (3308, 3310, 3311) statement enclosed in double square braces (3307, 3309), where the execution statement employs the grammar of the underlying database. This clause represents a destination database table or view for output rows to be updated at, inserted to, or deleted from.

Figure 34:
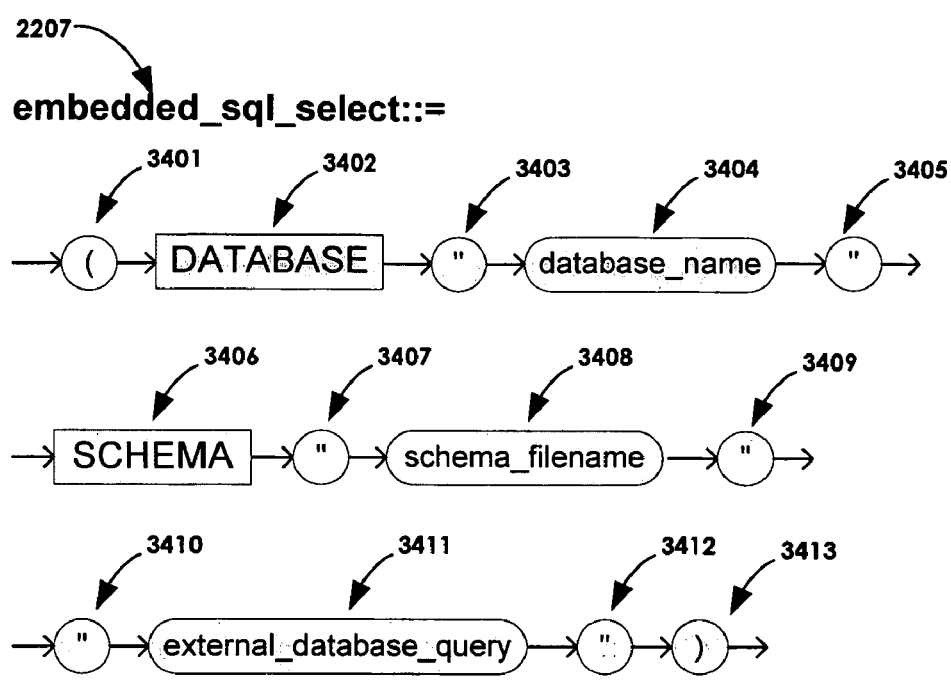
FIG. 34 illustrates a grammar for an embedded SQL SELECT statement.

One embodiment of the present invention provides grammar for the embedded_sql_select 2207 as illustrated in FIG. 34. The entire clause is enclosed in parenthesis (3401, 3413). The clause begins with the DATABASE 3402 keyword, followed by the database_name 3403 enclosed in double quotes (3403, 3405). This establishes the source database for the select operation. The schema for the query is established by the SCHEMA 3406 keyword followed by a schema_filename 3408 enclosed in double quotes (3407 and 3409). The schema file contains the name and datatype for each column in the destination table or view. The actual embedded external_database_query 3411 is enclosed in double quotes (3410, 3412), where the query statement employs the grammar of the underlying database.

One embodiment of the present invention provides a notation to denote data stream columns inserted into the external_database_query 3411 SQL statements in order to bind to the data stream columns at runtime. This allows correlation of data stream row columns and SQL table or view columns as a means to refine control over filters and join conditions. A simple notation such as a question mark preceding the data stream column or alias name may be used, but many other notations are possible and familiar to those skilled in the art.

Embodiments of the present invention having grammars that map to an efficient runtime environment extend the embedded_sql_select 2207 by including a CACHE INTERVAL subclause or similar. Such embodiments cache the view results of the external_database_query 3411 locally and update the cache periodically according to a time interval specified in the CACHE INTERVAL subclause. This will allow the query to execute quicker. Some embodiments do not extend the grammar for specifying a cache interval, and instead, employ a configuration file with the cache interval.

An example of an embedded continuously processing language for query with an EXECUTE STATEMENT (3301 and 3302) for row output has an embedded SQL UPDATE employing the embodiment described is listed as 3500 in FIG. 35. An example of an embedded continuously processing language for query using a DATABASE datasource with an embedded SQL SELECT employing the embodiment described is listed as 3600 in FIG. 36.

Figure 37:
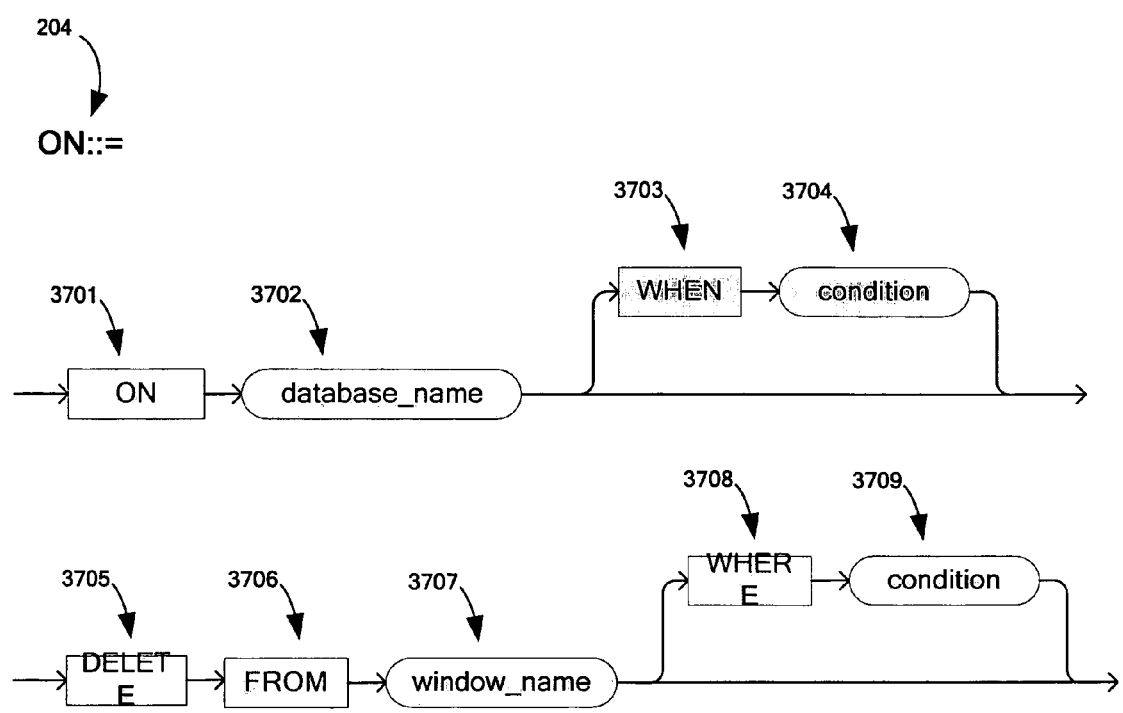
FIG. 37 illustrates a grammar for an ON statement.

One embodiment of the present invention provides grammar for the ON statement 204 as depicted in FIG. 37. This statement begins with the ON keyword 3701 followed by a database_name 3702. This is proceeded by an optional WHEN 3703 subclause comprising a trigger condition 3704. The mandatory DELETE FROM (3705 and 3706) subclause follows with a window_name 3707. The statement concludes with an optional WHERE 3708 clause with a condition 3709. As described previously, window declarations employing the KEEP 2601 clause describe retaining policies for rows and maintain implicit conditions for the removal of rows typically based on expiration criteria. The ON statement 204, however, represents a declaration for when to explicitly remove a row or rows from the named window when a row arrives to the named datastream 3702.

One embodiment of the present invention extends the ON statement 204 to include an optional trigger condition 3704 which allows further refined determination of which arriving rows will cause a trigger, if present, and is processed when each row arrives to the named datastream 3702. When a trigger does occur, the next row in the named window 3707 to expire is removed immediately.

One embodiment of the present invention extends the ON statement 204 to include an optional WHERE 3708 clause so that the condition 3709 specified determines all of the rows to remove. For example, the WHERE 3708 condition 3709 may specify that all rows in the window that have the same value of a named column as a specific column value of the arriving row can be removed.

The present invention has been described in particular detail with respect to a limited number of embodiments. Those of skill in the art will appreciate that the invention may additionally be practiced in other embodiments. The invention is not limited to the particular named clauses described herein, and those skilled in the art will appreciate that other names can be used for clauses with similar or identical functionality.

Furthermore, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method in a continuous processing system, comprising:
    subscribing to one or more continuous input data streams from one or more publishers of data streams, wherein each of the one or more continuous input data streams is published in a publisher-specific data representation format via a publisher-specific remote communication protocol;
    executing a query operation directly on the one or more continuous input data streams, including any windows of data within the one or more continuous input data streams, without any pre-processing of the continuous input data streams, including without storing the continuous input data streams in any data structure, prior to said executing, wherein the query operation is executed on a continuous basis; and
    publishing, in real time and on a continuous basis, a result of the query operation to one or more output data streams in a subscriber-specific data representation format via a subscriber-specific remote communication protocol as subscribed to by one or more subscribers, wherein the publisher-specific remote communication protocol varies from the subscriber-specific remote communication protocol.

2. The computer-implemented method of claim 1, wherein the executing further comprises:
    executing a first query operation directly on a first continuous input data stream without any pre-processing of the first continuous input data stream prior to said executing, wherein the first query operation is executed on a continuous basis;
    subscribing to a second continuous input data stream from the one or more publishers of data streams, wherein the second continuous input data stream is published in a second publisher-specific data representation format via a second publisher-specific remote communication protocol;
    executing a second query operation directly on the second continuous input data stream without any pre-processing of the second continuous input data stream prior to said executing, wherein the second query operation is executed on a continuous basis; and
    combining a first result of the first query operation with a second result of the second query operation to produce the result.

3. The computer-implemented method of claim 1, wherein the executing a query operation comprises:
    executing the query operation directly on the one or more continuous input data streams without loading said continuous data input stream into a table prior to said executing.

4. The computer-implemented method of claim 1, wherein the executing a query operation comprises:
    executing the query operation directly on the one or more continuous input data streams in said publisher-specific data representation format prior to said executing.

5. A non-transitory computer-readable medium having computer-executable instructions stored thereon that, when executed by a computing device, cause the computing device to perform a method comprising:
    subscribing to one or more continuous input data streams from one or more publishers of data streams, wherein each of the one or more continuous input data streams is published in a publisher-specific data representation format via a publisher-specific remote communication protocol;
    executing a query operation directly on the one or more continuous input data streams, including any windows of data within the one or more continuous input data streams, without any pre-processing of the continuous input data streams, including without storing the continuous input data streams in any data structure, prior to said executing, wherein the query operation is executed on a continuous basis; and
    publishing, in real time and on a continuous basis, a result of the query operation to one or more output data streams in a subscriber-specific data representation format via a subscriber-specific remote communication protocol as subscribed to by one or more subscribers, wherein the publisher-specific remote communication protocol varies from the subscriber-specific remote communication protocol.

6. The non-transitory computer-readable medium of claim 5, wherein the executing further comprises:
    executing a first query operation directly on a first continuous input data stream without any pre-processing of the first continuous input data stream prior to said executing, wherein the first query operation is executed on a continuous basis;
    subscribing to a second continuous input data stream from the one or more publishers of data streams;
    executing a second query operation directly on a second continuous input data stream without any pre-processing of the second continuous input data stream prior to said executing, wherein the second query operation is executed on a continuous basis;
    combining a first result of the first query operation with a second result of the second query operation to produce an output; and
    wherein publishing further comprises publishing, in real time and on a continuous basis, the output to the one or more output data streams.

7. A system comprising at least one processor and one memory, the processor including one or more units operating thereon and in conjunction with said memory, the one or more units comprising:
    a publication manager to subscribe to one or more continuous input data streams from one or more publishers of data streams, wherein each of the one or more continuous input data streams is published in a publisher-specific data representation format via a publisher-specific remote communication protocol;

a query module manager to execute a query operation directly on the one or more continuous input data streams, including any windows of data within the one or more continuous input data streams, without any pre-processing of the continuous input data streams, including without storing the continuous input data streams in any data structure, prior to said executing, wherein the query operation is executed on a continuous basis; and a subscription manager to publish, in real time and on a continuous basis, a result of the query operation to one or more output data streams in a subscriber-specific data representation format via a subscriber-specific remote communication protocol as subscribed to by one or more subscribers, wherein the publisher-specific remote communication protocol differs from the subscriber-specific remote communication protocol.

8. The system of claim 7, further comprising:
an adaptor manager to interpret the publisher-specific data representation format and to communicate with each of the one or more publishers of data streams using a respective publisher-specific remote communication protocol.

9. The system of claim 8, wherein the publication manager is configured to subscribe to a first continuous input data stream from a first publisher of data streams, and wherein the first continuous input data stream is published in a data representation format via a remote communication protocol that are specific to said first publisher.

10. The system of claim 9, wherein the adaptor manager comprises a first publisher adaptor to interpret the data representation format specific to said first publisher and to communicate with said first publisher using the remote communication protocol specific to said first publisher.

11. The system of claim 10, wherein the publication manager is further configured to subscribe to a second continuous input data stream from a second publisher of data streams, and wherein the second continuous input data stream is published in a data representation format via a remote communication protocol that are specific to said second publisher.

12. The system of claim 11, wherein the adaptor manager further comprises a second publisher adaptor to interpret the data representation format specific to said second publisher and to communicate with said second publisher using the remote communication protocol specific to said second publisher, wherein the data representation format specific to said second publisher differs from the data representation format specific to said first publisher, and wherein the remote communication protocol specific to said second publisher differs from the remote communication protocol specific to said first publisher.

13. The system of claim 12, wherein the subscription manager is configured to publish, in real time and on a continuous basis, a result of the query operation to a first output data stream, wherein a first subscriber subscribes to the first output data stream, and wherein the first output data stream is published in a data representation format via a remote communication protocol that are specific to said first subscriber.

14. The system of claim 13, wherein the adaptor manager further comprises a first subscriber adaptor to transform the result to the data representation format specific to said first subscriber and to communicate with said first subscriber using the first subscriber-specific remote communication protocol.

15. The system of claim 14, wherein the subscription manager is further configured to publish, in real time and on a continuous basis, a result of the query operation to a second output data stream, wherein a second subscriber subscribes to the second output data stream, and wherein the second output data stream is published in a data representation format via a remote communication protocol that are specific to said second subscriber.

16. The system of claim 15, wherein the adaptor manager further comprises a second subscriber adaptor to transform the result to the data representation format specific to said second subscriber and to communicate with said second subscriber using the remote communication protocol specific to said second subscriber, wherein the data representation format specific to said second subscriber differs from the data representation format specific to said first subscriber, and wherein the remote communication protocol specific to said second subscriber differs from the remote communication protocol specific to said first subscriber.

17. The system of claim 7, wherein the query module manager is further configured to
execute a first query operation directly on a first continuous input data stream,
further configured to execute a second query operation directly on a second continuous input data stream, and further configured to combine a first result of the first query operation with a second result of the second query operation to produce an output, wherein the first and second query operations are executed on a continuous basis without any pre-processing of the first continuous input data stream or the second continuous input data stream prior to said executing the first query and the second query, and
wherein the subscription manager is configured to publish, in real time and on a continuous basis, the output to one or more output data streams.

18. The system of claim 17, further comprising:
an adaptor manager to interpret the first and second publisher-specific data representation formats and to communicate with the first and second publishers of data streams using the respective first and second publisher-specific remote communication protocols.

19. The system of claim 18, wherein the subscription manager is configured to publish, in real time and on a continuous basis, the output to a first output data stream, wherein a first subscriber subscribes to the first output data stream, and wherein the first output data stream is published in a data representation format via a remote communication protocol that are specific to said first subscriber.

20. The system of claim 19, wherein the adaptor manager further comprises a first subscriber adaptor to transform the output to the data representation format specific to said first subscriber and to communicate with said first subscriber using the remote communication protocol specific to said first subscriber.

21. The system of claim 20, wherein the subscription manager is further configured to publish, in real time and on a continuous basis, the output to a second output data stream, wherein a second subscriber subscribes to the second output data stream, and wherein the second output data stream is published in a data representation format via a remote communication protocol that are specific to said second subscriber.

22. The system of claim 21, wherein the adaptor manager further comprises a second subscriber adaptor to transform the output to the data representation format specific to said second subscriber and to communicate with said second subscriber using the remote communication protocol specific to said second subscriber, wherein the data representation format specific to said second subscriber differs from the data representation format specific to said first subscriber, and wherein the remote communication protocol specific to said second subscriber differs from the remote communication protocol specific to said first subscriber.

* * * * *